(12) United States Patent
Caggioni et al.

(10) Patent No.: US 9,246,617 B2
(45) Date of Patent: Jan. 26, 2016

(54) REFORMATING A PLURALITY OF SIGNALS TO GENERATE A COMBINED SIGNAL COMPRISING A HIGHER DATA RATE THAN A DATA RATE ASSOCIATED WITH THE PLURALITY OF SIGNALS

(71) Applicant: APPLIED MICRO CIRCUITS CORPORATION, Sunnyvale, CA (US)

(72) Inventors: Francesco Caggioni, Winchester, MA (US); Dimitrios Giannakopoulos, Andover, MA (US)

(73) Assignee: Applied Micro Circuits Corporation, Santa Clara, CA (US)

( * ) Notice: Subject to any disclaimer, the term of this patent is extended or adjusted under 35 U.S.C. 154(b) by 137 days.

(21) Appl. No.: 14/021,035

(22) Filed: Sep. 9, 2013

(65) Prior Publication Data

US 2015/0071311 A1 Mar. 12, 2015

(51) Int. Cl.
 *H04J 3/02* (2006.01)
 *H04J 3/16* (2006.01)
(52) U.S. Cl.
 CPC ........................................ *H04J 3/16* (2013.01)
(58) Field of Classification Search
 None
 See application file for complete search history.

(56) References Cited

U.S. PATENT DOCUMENTS

| | | | |
|---|---|---|---|
| 7,512,150 B2 | 3/2009 | Walker et al. | |
| 7,539,196 B2 | 5/2009 | Flavin et al. | |
| 7,742,502 B2 | 6/2010 | Vissers et al. | |
| 8,223,638 B2 | 7/2012 | Walker et al. | |
| 8,238,373 B2 | 8/2012 | Jiang | |
| 8,406,178 B2 | 3/2013 | Tan et al. | |
| 8,412,051 B2 | 4/2013 | El-Ahmadi et al. | |
| 8,514,897 B2 | 8/2013 | Jiang | |
| 2005/0163162 A1 | 7/2005 | Lanzone et al. | |
| 2010/0329669 A1* | 12/2010 | Cunningham et al. | 398/41 |
| 2011/0135312 A1 | 6/2011 | El-Ahmadi et al. | |
| 2012/0300771 A1 | 11/2012 | Nonaka et al. | |
| 2013/0177309 A1 | 7/2013 | El-Ahmadi et al. | |

* cited by examiner

*Primary Examiner* — Minh-Trang Nguyen
(74) *Attorney, Agent, or Firm* — Amin, Turocy & Watson, LLP

(57) ABSTRACT

Various aspects provide for aggregating a plurality of signals to generate a combined signal. An aggregation component is configured for reformatting a plurality of first signals and combining the plurality of first signals to generate a combined signal that comprises a higher data rate than a data rate associated with the plurality of first signals. A transmitter component is configured for receiving the combined signal and generating one or more data streams based on the combined signal. In an aspect, the aggregation component is additionally configured for reformatting and/or combining the plurality of first signals and at least one second signal to generate the combined signal. In another aspect, a receiver component is configured for generating a pseudo signal at a data rate of the combined signal. In yet another aspect, a de-aggregation component is configured for recovering the plurality of first signals and/or the at least one second signal from the pseudo signal.

22 Claims, 16 Drawing Sheets

REFORMATING A PLURALITY OF SIGNALS TO GENERATE A COMBINED SIGNAL COMPRISING A HIGHER DATA RATE THAN A DATA RATE ASSOCIATED WITH THE PLURALITY OF SIGNALS

TECHNICAL FIELD

The subject disclosure relates generally to networking, and more particularly to reformatting and/or combining a plurality of signals to generate a combined signal that comprises a higher data rate than a data rate associated with the plurality of signals.

BACKGROUND

Electronic communications, whether over a local or wide-area network or among components of a local bus, can involve a variety of programmed actions and/or protocols. For instance, data to be transmitted throughout a network (e.g., from one electronic component to another) is often organized into subgroups of transmitted information. A networking protocol can specify formats and/or rules for the transmission and/or reception of data (e.g., data signals) within a network (e.g., an Ethernet network). For example, a networking protocol can provide various formats and/or rules for routing data signals in a network (e.g., routing data signals between hubs, switches and/or routers).

Often times, numerous devices in a network are configured to retime, multiplex and/or de-multiplex data signals (e.g., incoming network traffic). For example, a network component can receive one or more 10 gigabit per second (Gbps) Ethernet signals and can output four 25 Gbps Ethernet signals to allow more efficient transport of the data signal throughout the network. However, often times a network includes a variety of signal types (e.g., a variety of network protocols) and/or a variety of signal data rates. However, current network systems do not adequately process and/or transmit network signals associated with various signals types and/or various data rates. Therefore, functionality and/or efficiency of current network systems can be improved.

The above-described description is merely intended to provide a contextual overview of current network systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises an aggregation component and a transmitter component. The aggregation component is configured for reformatting a plurality of first signals and combining the plurality of first signals to generate a combined signal that comprises a higher data rate than a data rate associated with the plurality of first signals. The transmitter component is configured for receiving the combined signal and generating one or more data streams based on the combined signal.

In another example embodiment, a method comprises receiving, by a system comprising a processor, a plurality of first signals. The method also comprises reformatting, by the system, a signal format of the plurality of first signals to generate a plurality of modified signals. Additionally, the method comprises combining, by the system, the plurality of modified signals to generate a combined signal that comprises a higher data rate than a data rate associated with the plurality of first signals.

In yet another example embodiment, a system includes a means for receiving a plurality of first signals. The system also comprises a means for reformatting a signal format of the plurality of first signals. Additionally, the system comprises a means for combining the plurality of first signals to generate a combined signal that comprises a higher data rate than a data rate associated with the plurality of first signals.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
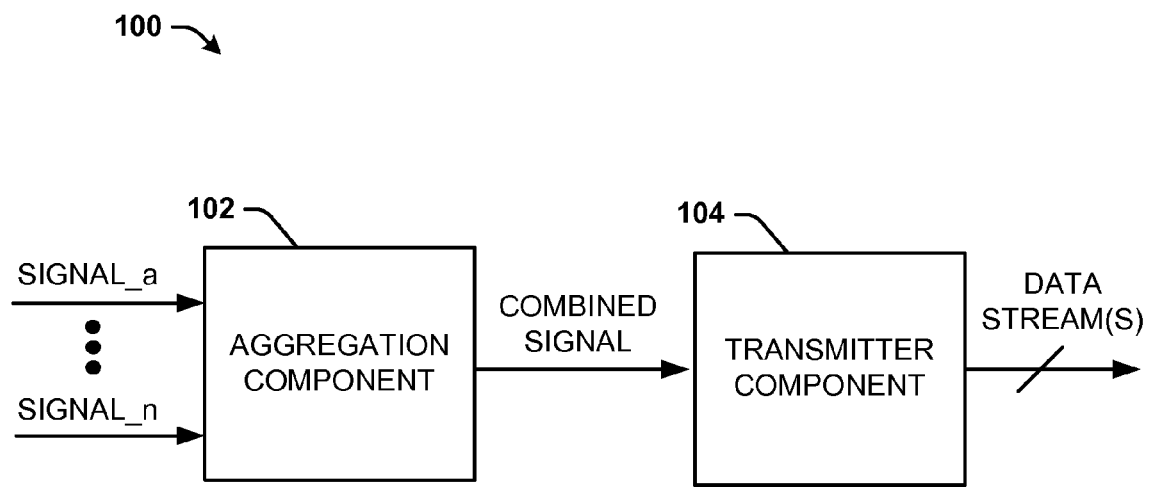
FIG. 1 is a block diagram illustrating an example, non-limiting embodiment of a system for reformatting and/or combining a plurality of signals to generate a combined signal in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide a system for reformatting and/or combining a plurality of signals to generate a combined signal that comprises a higher data rate than a data rate associated with the plurality of signals. As such, signals that comprise different data rates can be transmitted (e.g., over a serial interface and/or a parallel interface associated with the same data rate) via a combined signal that comprises a single data rate and/or a higher data rate. For example, a plurality of first signals with a first data rate (e.g., 10 gigabits per second (G)) and/or at least one second signal with a second data rate (e.g., 40 G) can be aggregated into a combined signal with a higher data rate (e.g., 100 G) than the first data rate associated with the plurality of first signals and/or the second data rate associated with the at least one second signal. Therefore, the plurality of first signals and/or the at least one second signal (e.g., original signals) can be transmitted via one or more interfaces that do not support a data rate of the plurality of first signals and/or the at least one second signal. Furthermore, the plurality of first signals and/or the at least one second signal (e.g., original signals) can be recovered at a different point in a network pipeline. As such, the combined signal can be a homogeneous signal that can include a plurality of signals with one or more data rates (e.g., the combined signal can include 10 G, 40 G and/or 100 G signals). Thus, network components that utilize (e.g., support) a high data rate (e.g., 100 G) can transmit signals with a lower data rate (e.g., 10 G and/or 40 G) over a data link with the high data rate (e.g., 100 G). Furthermore, a variety of signal types (e.g., optical transport network (OTN), Ethernet, Fibre Channel (FC), synchronous optical networking (SONET/SDH), other signal types, etc.) can be supported. Accordingly, network efficiency and/or reliability can be increased.

Turning now to FIG. 1, a block diagram illustrating an example, non-limiting embodiment of a network system in accordance with various aspects described herein is shown. System 100 includes an aggregation component 102 and a transmitter component 104. In one example, the system 100 can be implemented in a data communication system and/or a telecommunication system. For example, the system 100 can be implemented in, but not limited to, an Ethernet network system, an OTN system and/or a FC system. However, it is to be appreciated that the system 100 can be implemented as a different type of network system. Furthermore, it is to be appreciated that the system 100 can be associated with more than one type of data communication system and/or telecommunication system.

In an example, the system 100 can accept data rates and/or generate data rates (e.g., serial data rates) of 10 G, 40 G and/or 100 G (e.g., with virtual lane interleaving nodes). However, it is to be appreciated that the system 100 can be implemented for different signal rates. The system 100 can be implemented on a system interface, a client interface, a host interface and/or a line interface. In one example, the system 100 can be implemented on a transmitter device and/or a transceiver device. In an aspect, the system 100 can be implemented on a printed circuit board (PCB). In an aspect, the system 100 can be implemented on an application-specific integrated circuit (ASIC). In yet another aspect, the system 100 can be implemented on and/or in connection with a chassis system. However, it is to be appreciated that the system 100 can be implemented on and/or in connection with a different type of system (e.g., a network box system, etc.).

The aggregation component 102 can receive a plurality of signals (e.g., SIGNAL_a-SIGNAL_n shown in FIG. 1). In one example, the plurality of signals can be a plurality of client signals. In an aspect, the plurality of signals can be received via and/or associated with one or more channels (e.g., data stream channels). The plurality of signals can be received via and/or associated with one or more physical lanes (e.g., one or more physical connections). For example, the plurality of signals can be received via copper cable, optical fiber and/or wireless transmission medium. The plurality of signals can be implemented as a plurality of OTN signals (e.g., OTU2 signals, OTU2e signals, OTU1e, OTU3, OU3e2, etc.), a plurality of Ethernet signals, a plurality of Fibre Channel (FC) signals, a plurality of synchronous optical networking signals (SONET/SDH) and/or a plurality of other signals. In an example, the plurality of signals can be encoded signals. In one example, the plurality of signals can be implemented as physical coding sub-layer (PCS) lanes. In one embodiment, the plurality of signals can be generated by a processor (not shown). For example, the plurality of signals can be generated by a network processing unit (NPU). In another embodiment, the plurality of signals can be generated by a media access control (MAC) device (not shown). Furthermore, the plurality of signals can be a serial stream of formatted blocks. For example, the plurality of signals can be a serial stream of 64B/66B formatted blocks (e.g., a 64B/66B encoded signal). In one example, the plurality of signals can include one or more bits (e.g., two bits) for boundary identification, one or more header bits and/or one or more bits (e.g., 64 bits) containing scrambled information.

The plurality of signals can include a plurality of first signals and/or at least one second signal. For example, the plurality of signals can include a plurality of first signals with a first data rate (e.g., 10 G) and/or at least one second signal with a second data rate (e.g., 40 G, 100 G, etc.). However, it is to be appreciated that the aggregation component 102 can receive a different number of signal types (e.g. the aggregation component 102 can receive at least one third signal with a third data rate, etc.). In a non-limiting example, the plurality of signals can include a plurality of 10 G signals, at least one 40 G signal and/or at least one 100 G signal. However, it is to be appreciated that the plurality of signals can include different data rates (e.g., 8 G, 20 G, 50 G, 100 G, etc.). Furthermore, it is to be appreciated that the plurality of signals can include different signal types. In an aspect, a data rate of the plurality of signals (e.g., the plurality of first signals and the at least one second signal) can be an approximate data rate. For example, a data rate of the plurality of first signals can be a data rate within a certain range of values (e.g., a range of values around 10 G). In another aspect, a data rate of the plurality of signals (e.g., the plurality of first signals and the at least one second signal) can be a maximum data rate of the plurality of signals. For example, the plurality of first signals can be a plurality of signals with a data rate less than or equal to 10 G.

In an aspect, the aggregation component 102 can receive a plurality of first signals. For example, the aggregation component 102 can receive a plurality of 10 G signals. However, it is to be appreciated that the aggregation component 102 can receive a plurality of signals with a different data rate (e.g., 40 G). In another aspect, the aggregation component 102 can receive a plurality of first signals and at least one second signal (or a plurality of second signals). The at least one second signal can comprise a higher data rate or a lower data rate than the plurality of first signals. For example, the aggregation component 102 can receive a plurality of 10 G signals (e.g., a plurality of first signals) and at least one 40 G signal (e.g., at least one second signal). However, it is to be appreciated that the aggregation component 102 can receive a plurality of first signals with a different data rate and/or at least one second signal with a different data rate. In one example, the number of first signals can correspond to the number of second signals. In another example, the number of first signals and the number of second signals can be different. In an aspect, the aggregation component 102 can receive the plurality of first signals and/or the at least one second signal via a plurality of data channels.

The aggregation component 102 can be configured to reformat the plurality of first signals. For example, the aggregation component 102 can convert the plurality of first signals into a plurality of first modified signals. The plurality of first modified signals can comprise a signal format different than the plurality of first signals. In one non-limiting example, the aggregation component can convert ten 10 G signals into ten modified 10 G signals. In one example, the plurality of first modified signals can be a plurality of OTUFlex signals. Additionally or alternatively, the aggregation component 102 can be configured to reformat the at least one second signal. For example, the aggregation component 102 can convert the at least one second signal into a plurality of second modified signals. The plurality of second modified signals can comprise a signal format different than the at least one second signal. In an aspect, the aggregation component 102 can convert the plurality of first signals and/or the at least one second signal into one or more tributary signals (e.g., one or more sub-signals) before being converted into a plurality of second modified signals. For example, the aggregation component can convert a 40 G signal into four 10 G tributary signals (e.g., four 10 G sub-signals). As such, each of the four 10 G tributary signals (e.g., each of the four 10 G sub-signals) can be converted into a modified signal. In one non-limiting example, the aggregation component can convert two 10 G signals (e.g., a plurality of first signals) into two modified 10 G signals (e.g., a plurality of first modified signals) and two 40 G signals (e.g., a plurality of second signals) into eight modified 40 G signals (e.g., a plurality of second modified signals).

Additionally, the aggregation component 102 can combine (e.g., aggregate) the plurality of first signals and/or the at least one second signal to generate a combined signal (e.g., a pseudo data signal). The combined signal can comprise a higher data rate than a data rate associated with the plurality of first signals and/or the at least one second signal. In an aspect, the combined signal can include a plurality of virtual lanes. As such, the aggregation component 102 can reformat the plurality of first modified signals and/or the plurality of second modified signals into a plurality of virtual lanes of the combined signal. In an aspect, the aggregation component 102 can de-multiplex each of the first modified signals and/or each of the second modified signals into a first virtual lane and a second virtual lane to generate a plurality of virtual lanes of the combined signal. For example, the aggregation component 102 can allocate a portion of a particular modified signal to a first virtual lane. Additionally, the aggregation component 102 can allocate another portion of the particular modified signal to a second virtual lane. In an aspect, the plurality of virtual lanes of the combined signal can be synchronous to a common clock domain. In one example, the plurality of virtual lanes can be implemented as multi-link gearbox (MLG) lanes. For example, the combined signal can be generated by an MLG protocol. In one non-limiting example, the plurality of virtual lanes can be pseudo-100 G virtual lanes. As such, the plurality of signals (e.g., the plurality of first signals and/or the at least one second signal) can be represented as a plurality of virtual lanes of a combined signal.

In an aspect, the aggregation component 102 can generate one or more alignment marker (AM) signals. An AM signal can identify an unpopulated lane (e.g., an unpopulated virtual lane) of the combined signal. As such, the combined signal can include the plurality of virtual lanes and/or one or more AM signals. Accordingly, the AM signal can be employed to identify data not associated with the plurality of first signals and/or the at least one second signal.

The transmitter component 104 can be configured to bit interleave the plurality of virtual lanes of the combined signal to generate one or more data streams (e.g., DATA STREAM (S) shown in FIG. 1). The one or more data streams can be a plurality of physical lanes. In one example, the one or more data streams can be a plurality of PCS lanes. As such, the plurality of first signals and/or the at least one second signal can be encoded in the one or more data streams. In an aspect, the transmitter component 104 can be implemented as an inter-device connection compatible with CAUI-4. For example, the transmitter component 104 can be implemented as a multi-lane (e.g., 4-lane) 100GBASE-R protocol device. CAUI-4 can be an inter-device connection. For example, CAUI-4 can be a physical instantiation of a signal in a plurality of physical lanes (e.g., a 100 G signal in four physical lanes) across a physical medium (e.g., a copper medium) for interconnect between a first device and a second device (e.g., between a MAC device and a PHY device, between a pair of PHY devices, etc.). As such, CAUI-4 can be a four-lane instantiation of a signaling protocol defined for transmission of an aggregate data stream (e.g., a 100 G data stream) across various media (e.g., 100GBASE-R). It is to be appreciated that CAUI-4 can be associated with other types of interfaces (e.g., CPPI-4, OIF-28G-VSR, etc.). As such, the one or more data streams can be an aggregate data stream (e.g., an aggregate 100 G data stream) that comprises one or more physical lanes (e.g., a 100 G physical lane, two 50 G physical lanes, four 25 G physical lanes, five 20 G physical lanes, ten 10 G physical lanes, etc.).

Figure 2:
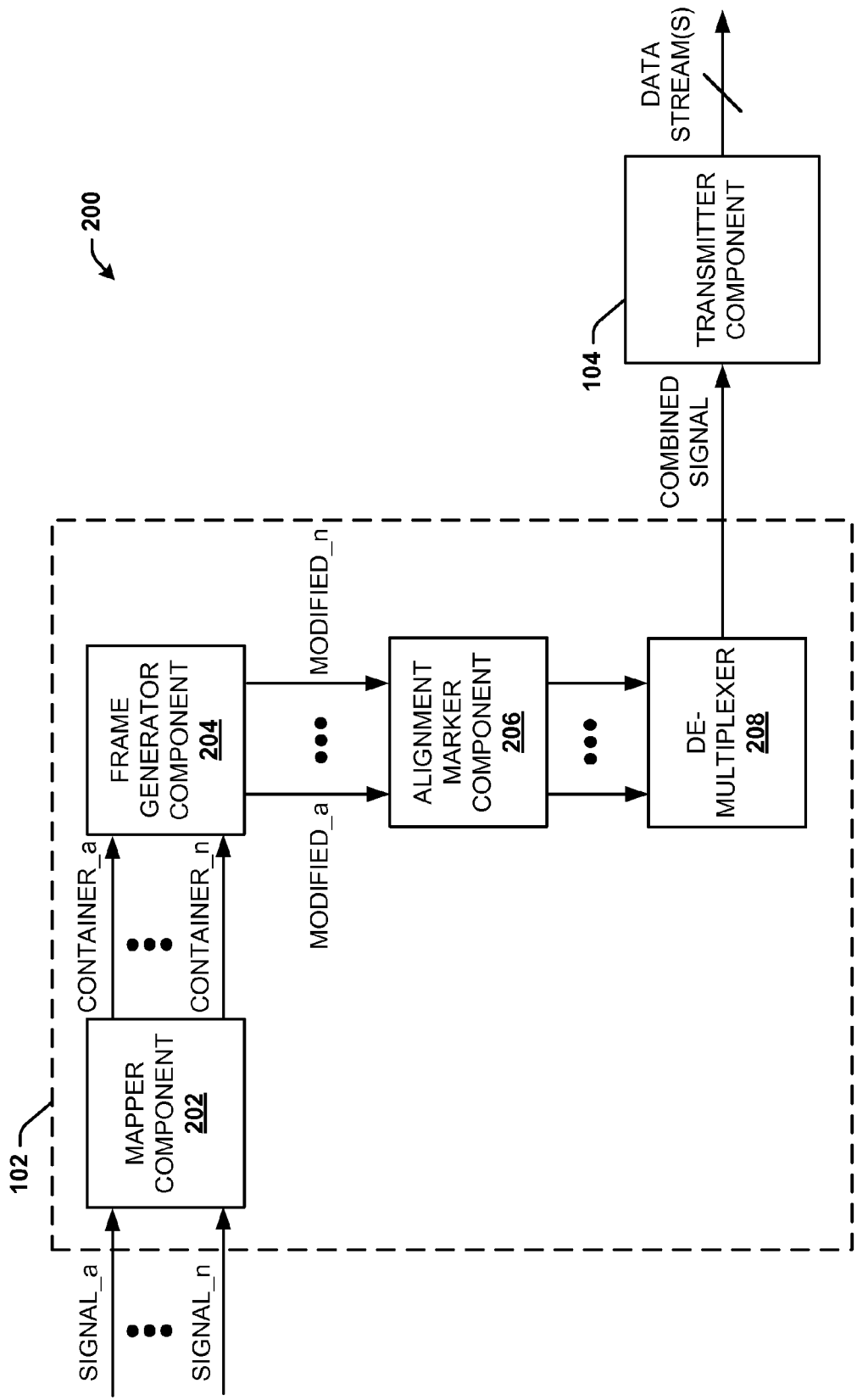
FIG. 2 is a block diagram illustrating an example, non-limiting embodiment of an aggregation component in accordance with various aspects described herein.

Referring now to FIG. 2, a block diagram illustrating an example, non-limiting embodiment of an aggregation component in accordance with various aspects described herein is shown. The aggregation component 102 can include at least a mapper component 202, a frame generator component 204, a alignment marker component 206 and/or a de-multiplexer 208. In one example, the frame generator component 204 can be implemented as an OTUFlex frame generator. In an aspect, the de-multiplexer 208 can be implemented after the alignment marker component 206. In another aspect, the de-multiplexer 208 can be implemented before the alignment marker component 206.

The mapper component 202 can be configured to encapsulate the plurality of first signals into a plurality of first container signals that comprise a signal format different than the plurality of first signals. For example, the mapper component 202 can map the plurality of first signals into the plurality of first container signals via one or more mapping algorithms. Additionally or alternatively, the mapper component 202 can be configured to encapsulate the at least one second signal into a plurality of second container signals that comprise a signal format different than the at least one second signal. For example, the mapper component 202 can map the at least one second signal into the plurality of second container signals via one or more mapping algorithms. In one example, the plurality of first container signals and/or the plurality of second container signals can be a plurality of OTUFlex container signals. For example, an OTUFlex container signal (e.g., an OTUFlex channel) can be an independent data stream (e.g., an independent 10 G data stream, etc.) that serves as a container signal for a client signal (e.g., a signal from the plurality of first signals, a signal from the at least one second signal, a tributary signal from the at least one second signal, etc.) which is mapped via the mapper component 202. As such, the mapper component 202 can generate a plurality of container signals (e.g., CONTAINER_a-CONTAINTER_n shown in FIG. 2).

The mapper component 202 can rate adapt the plurality of first signals and/or the at least one second signal. As such, the plurality of first container signals can include a higher data rate than a data rate associated with the plurality of first signals and/or the plurality of second container signals can include a higher data rate than a data rate associated with the at least one second signal. In an aspect, the plurality of first signals and/or the at least one second signal can be rate adapted as a function of a data rate of the combined signal generated by the aggregation component 102. Accordingly, the mapper component 202 can encapsulate various signal types, such as but not limited to, OTN, Ethernet, Fibre Channel and/or constant bit rate (CBR), into a single OTUFlex container signal. Additionally, the mapper component 202 can provide timing transparency for the plurality of first signals and/or the at least one second signal, where each source clock associated with the plurality of first signals and/or the at least one second signal can be accurately reproduced (e.g., recovered) later in a network pipeline (e.g., by a receiver component and/or a de-aggregation component).

The frame generator component 204 can be configured to generate a plurality of first modified signals based on the plurality of first container signals. For example, the frame generator component 204 can add data from a first container signal of the plurality of first container signals to a payload field of a corresponding first modified signal. As such, payload fields of the plurality of first modified signals can include data associated with the plurality of first container signals. Additionally or alternatively, the frame generator component 204 can be configured to generate a plurality of second modified signals based on the plurality of second container signals. For example, the frame generator component 204 can add data from a second container signal of the plurality of second container signals to a payload field of a corresponding second modified signal. As such, payload fields of the plurality of second modified signals can include data associated with the plurality of second container signals. Accordingly, the frame generator component 204 can generate a plurality of modified signals (e.g., MODIFIED_a-MODIFIED_n shown in FIG. 2).

The plurality of first modified signals and/or the plurality of second modified signals can be partitioned into a plurality of data fields. The plurality of data fields can comprise at least an alignment marker (AM) field and a payload field. However, the plurality of data fields can additionally include, but is not limited to, a frame alignment signal (FAS) field, a bit interleaved parity 8 (BIP-8) field, an overhead (OH) field and/or a justification (JUST) field. For example, a frame (e.g., a plurality of data field) of a modified signal (e.g., each of the plurality of first modified signals and/or each of the plurality of second modified signals) can include a first field (e.g., FAS field), a second field (e.g., AM field), a third field (e.g., BIP-8 field), a fourth field (e.g., OH field), a fifth field (e.g., JUST field) and a sixth field (e.g., payload field).

The FAS field can comprise one or more bytes (e.g., 6 bytes). The FAS field can indicate a start of a frame (e.g., a first partition of a frame for a modified signal). The FAS field can be repeated periodically (e.g., after a last partition of a frame for a modified signal is generated). For example, the FAS field can be repeated after a payload field is generated. The FAS field can include a pattern of data. For example, the FAS field can include a first byte of data (e.g., OA1) that is repeated one or more times and a second byte of data (e.g., OA2) that is repeated one or more times (e.g., a OA1-OA1-OA1-OA2-OA2-OA2 pattern). In one example, the first byte of data can be represented as "1111 0110" and the second byte of data can be represented as "0010 1000". However, it is to be appreciated that a different number of byte values and/or different byte values can be utilized.

The FAS field can be followed by the AM field. The AM field can be implemented for lane identification and/or de-skewing purposes. In one example, the AM field can be a 1-byte data field. A value of the AM field can be incremented every frame. In an aspect, a value of the AM field can be generated by and/or associated with a roll-over counter. In one example, a least significant bit (LSB) of the AM field can specify a virtual lane identification (ID). For example, a virtual lane ID can be specified for each of the plurality of virtual lanes of the combined signal. In an aspect, a LSB value of "0" can represent a first virtual lane (e.g., virtual lane 0) of a modified signal and a LSB value of "1" can represent a second virtual lane (e.g., virtual lane 1) of a modified signal. The remaining bits of the AM field (e.g. the remaining 7 bits) can be utilized by a de-aggregator component (described in more detail in connection with FIG. 4) for de-skewing the plurality of virtual lanes included in the combined signal.

The BIP-8 field can be utilized for monitoring purposes. In one example, a value for the BIP-8 field can be computed as a function of bits associated with the AM field, the OH field, the JUST field, and/or the payload field. As such, a value for the BIP-8 field can be generated as a function of the AM field, the OH field, the JUST field, and/or the payload field (e.g., a value for the BIP-8 field can be generated without data included in the FAS field). In an aspect, the BIP-8 field can be a third partition of a frame. In one example, the BIP-8 field can be associated with even parity error checking. In another example, the BIP-8 field can be associated with odd parity error checking.

The OH field can be implemented for overhead purposes. A value of the OH field can be all zeros when the OH field is not utilized (e.g., prior to scrambling). In one example, the OH field can be two bytes. However, it is to be appreciated that the OH field can be a different size.

The JUST field can include one or more bytes associated with justification information (e.g., for rate adaptation of the plurality of first signals and/or the at least one second signal) and/or cyclic redundancy check (CRC) parity protection. In one example, the JUST field can be associated with a generic mapping procedure (GMP).

The payload field can be a payload area. The payload field can include data associated with a container signal (e.g., the payload field can be a data field that includes data from the plurality of first signals and/or the at least one second signal). For example, a container signal from the plurality of first container signals and/or the plurality of second container signals can be included in a payload field of a modified signal. The payload field can include one or more payload bytes and/or one or more stuff bytes. The one or more payload bytes can correspond to a data associated with a container signal (e.g., a container signal generated from the plurality of first modified signals and/or the plurality of second modified signals). In an aspect, a location of the one or more stuff bytes with respect to the one or more payload bytes can be determined by a mapping algorithm implemented by the mapper component 202. In one example, the mapping algorithm can be a Sigma-Delta ($\Sigma$-$\Delta$) algorithm. A stuff value for each stuff byte can be a predetermined stuff value. For example, a value for each stuff byte (e.g., a predetermined stuff value) can be a particular hexadecimal value (e.g., an "A5" hexadecimal value). In an aspect, a predetermined stuff value can be a pattern that includes a certain number (e.g., a minimum number) of 1/0 (or 0/1) bit transitions. For example, the payload field can be unscrambled (e.g., data included in the payload field can be unscrambled). As such, a predetermined stuff value other than a value of all "0" bits or all "1" bits can be utilized. In one example, the payload field can be 16304 bytes.

In an aspect, the AM field, the BIP-8 field, the OH field and/or the JUST field can be scrambled. In one example, the AM field, the BIP-8 field, the OH field and/or the JUST field can be scrambled based on a scrambler associated with a polynomial function (e.g., $1+x+x3+x12+x16$). In an aspect, the scrambler can reset (e.g., reset to hexadecimal value "FFFF") a most significant bit of a frame after a last framing byte in the frame.

The alignment marker component 206 can be configured to insert an alignment marker value into the alignment marker field for each of the plurality of first modified signals to identify each of the plurality of first modified signals. The alignment marker component 206 can implement an alignment marker insertion function. The alignment marker component 206 can add a lane alignment marker to the plurality of virtual lanes of the combined signal. In an aspect, the alignment marker component 206 can add an AM value (e.g., an AM value contained in an incrementing counter) to the AM field. Accordingly the alignment marker can facilitate identification and/or alignment of the plurality of virtual lanes of the combined signal. As such, the alignment marker component 206 can facilitate identification and/or alignment of the plurality of virtual lanes. In an aspect, assignment of a lane number to each of the generated virtual lanes (e.g., the plurality of virtual lanes) can be arbitrary.

The de-multiplexer component 208 can be configured to de-multiplex each of the first modified signals into a first virtual lane and a second virtual lane to generate a plurality of virtual lanes of the combined signal. For example, the de-multiplexer 208 can be configured to allocate a portion of each of the first modified signals to a first virtual lane and another portion of each of the first modified signals to a second virtual lane. As such, a first modified signal of the plurality of first modified signals can be de-interleaved into a first virtual lane and a second virtual lane, a different first modified signal of the plurality of first modified signals can be de-interleaved into a different first virtual lane and a different second virtual lane, etc. Additionally or alternatively, the de-multiplexer component 208 can be configured to de-multiplex each of the second modified signals into a first virtual lane and a second virtual lane to generate the plurality of virtual lanes of the combined signal. For example, the de-multiplexer 208 can be configured to allocate a portion of each of the second modified signals to a first virtual lane and another portion of each of the second modified signals to a second virtual lane. As such, a second modified signal of the plurality of second modified signals can be de-interleaved into a first virtual lane and a second virtual lane, a different second modified signal of the plurality of second modified signals can be de-interleaved into a different first virtual lane and a different second virtual lane, etc.

The de-multiplexer 208 can de-multiplex blocks (e.g., blocks of 16 bytes) of each of the plurality of first modified signals and/or each of the plurality of second modified signals into first virtual lanes and second virtual lanes of the combined signal. In an aspect, the de-multiplexer 208 can implement a round-robin distribution scheme. For example, the de-multiplexer 208 can apply a first data block of a modified signal to a first virtual lane, a second data block of the modified signal to a second virtual lane, a third data block of the modified signal to the first virtual lane, a fourth data block of the modified signal to the second virtual lane, etc. The round-robin distribution scheme can be repeated until an end of a frame. In response to an end of a frame, de-multiplexing can be rotated (e.g., when an end of a current frame is reached, a lane rotation scheme is employed). For example, at the end of each frame, the de-multiplex order reverses (e.g., rotates) from the current virtual lane to an alternate virtual lane. When an end of a second frame is reached, the de-multiplex order can rotate again.

Figure 3:
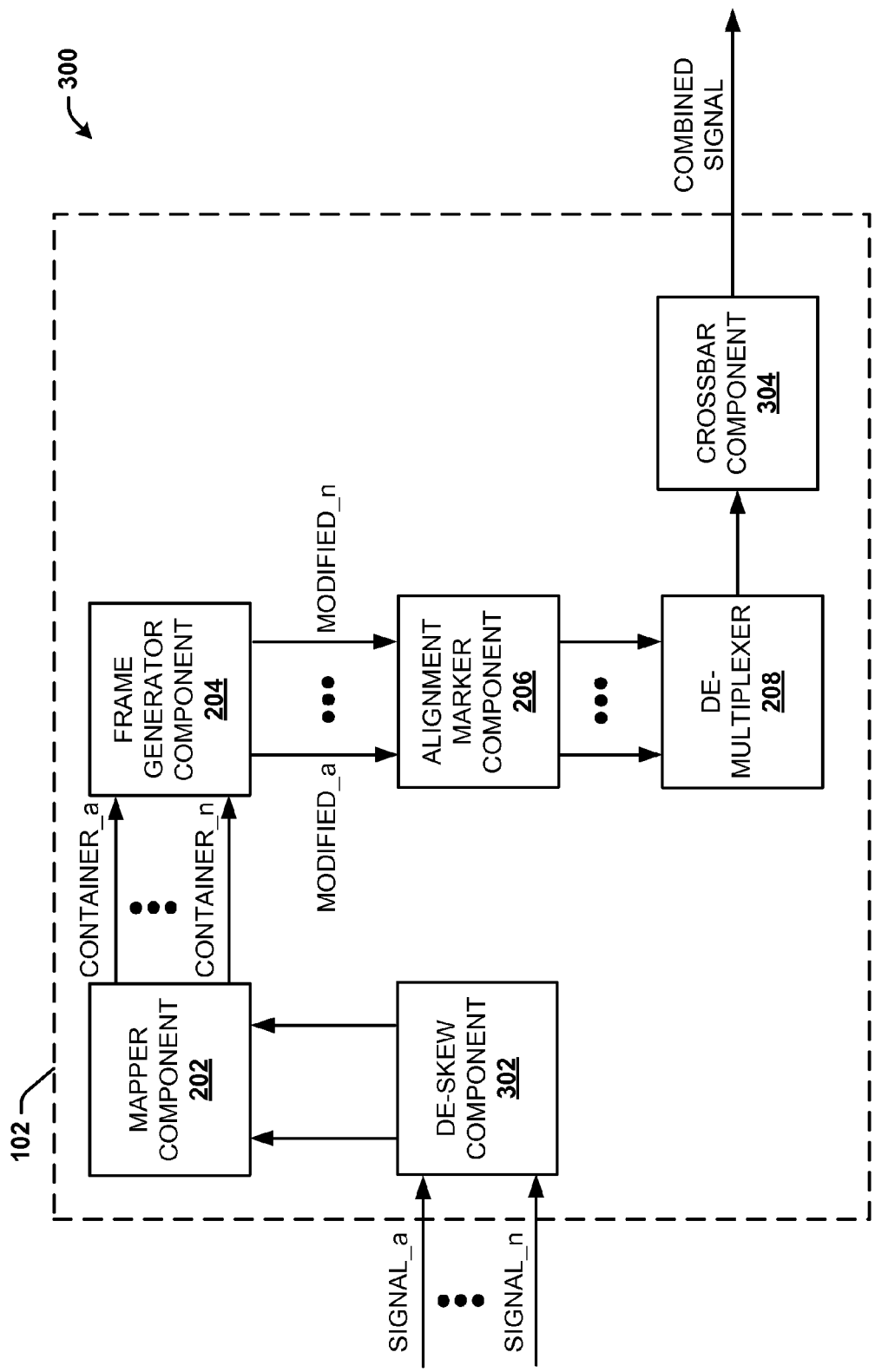
FIG. 3 is a block diagram illustrating another example, non-limiting embodiment of an aggregation component in accordance with various aspects described herein.

Referring now to FIG. 3, a block diagram illustrating another example, non-limiting embodiment of an aggregation component in accordance with various aspects described herein is shown. The aggregation component 102 can include at least the mapper component 202, the frame generator component 204, the alignment marker component 206 and/or the de-multiplexer 208. Additionally, the aggregation component 102 can include a de-skew component 302 and/or a crossbar component 304.

The de-skew component 302 can be configured to align the plurality of first signals and/or the plurality of second signal. For example, the de-skew component 302 can implement a de-skew function to align the plurality of first signals and/or the at least one second signal. In an aspect, the de-skew component 302 can implement a de-skew function to align one or more tributary signals (e.g., sub-signals) of the plurality of first signals and/or the at least one second signal. For example, the de-skew component 302 can implement a de-skew function to align four 10 G tributary signals (e.g., four 10 G sub-signals) of a 40 G signal. As such, the de-skew component 302 can be implemented to avoid skew accumulation between the plurality of first signals and/or the at least one second signal (e.g., signal lanes, channels, etc.) over two or more links. The de-skew component 302 can implement de-skewing before the plurality of first signals and/or the plurality of second signal are transmitted to the mapper component 202.

In a non-limiting example, the aggregation component 102 can receive ten 10 G signals. The first four 10 G signals (e.g., a first signal, a second signal, a third signal and a fourth signal) can be associated with a 40 G client. The remaining six 10 G signals (e.g., the fifth signal, the sixth signal, the seventh signal, the eighth signal, the ninth signal and the tenth signal) can be associated with 10 G clients. The de-skew component 302 can de-skew the first four 10 G signals. Furthermore, the remaining six 10 G signals can be transmitted directly to the mapper component 202 (e.g., the remaining six 10 G signals are not de-skewed by the de-skew component 302). It is to be appreciated that in this non-limiting example any of the ten 10 G signals could have been selected for de-skewing by the de-skew component 302.

The crossbar component 304 can arbitrarily map the plurality of virtual lanes of the combined signal. For example, the crossbar component 304 can arbitrarily map a first virtual lane of the combined signal and/or a second virtual lane of the combined signal (e.g., a pair of virtual lanes in the combined signal) to any of the lane slots being transmitted to the transmitter component 104.

Figure 4:
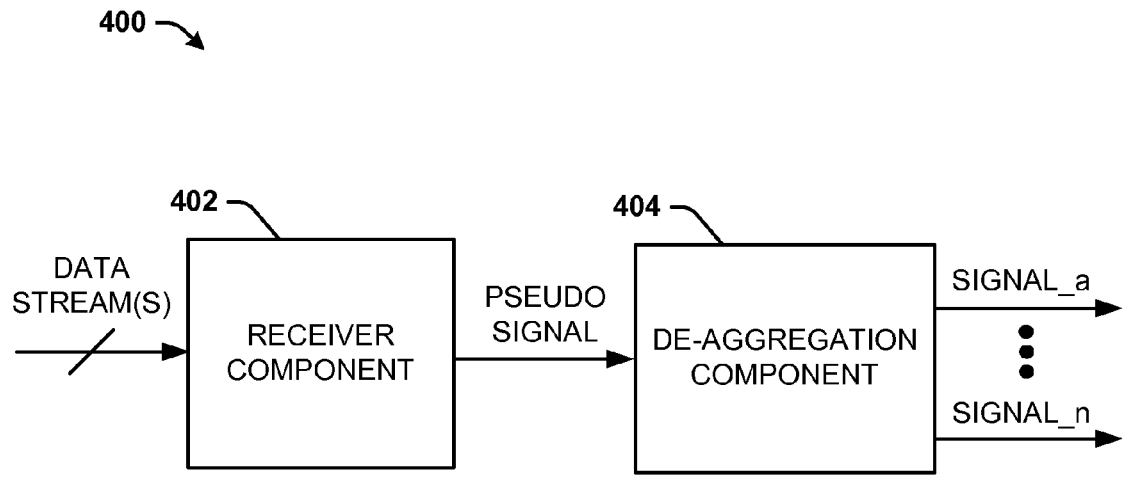
FIG. 4 is a block diagram illustrating an example, non-limiting embodiment of a system for obtaining a plurality of signals from a combined signal in accordance with various aspects described herein.

Referring now to FIG. 4, a block diagram illustrating an example, non-limiting embodiment of a network system in accordance with various aspects described herein is shown. System 400 includes a receiver component 402 and a de-aggregation component 404. In an aspect, system 400 can be implemented in connection with system 100, system 200 or system 300. In one example, the system 400 can be implemented in a data communication system and/or a telecommunication system. For example, the system 400 can be implemented in, but not limited to, an Ethernet network system, an OTN system and/or a FC system. However, it is to be appreciated that the system 400 can be implemented as a different type of network system. Furthermore, it is to be appreciated that the system 400 can implement more than one type of network system.

The system 400 can be implemented on a system interface, a client interface, a host interface and/or a line interface. In one example, the system 400 can be implemented on a receiver device and/or a transceiver device. In an aspect, the system 400 can be implemented on a PCB. In an aspect, the system 400 can be implemented on an ASIC. In yet another aspect, the system 400 can be implemented on and/or in connection with a chassis system.

The receiver component 402 can be configured to receive one or more data streams. For example, the one or more data streams can be transmitted by the transmitter device 104. The one or more data streams can be a plurality of physical lanes. In one example, the one or more data streams can be a plurality of PCS lanes. In an aspect, a plurality of first signals and/or the at least one second signal can be encoded in the one or more data streams. In one example, the receiver component 402 can be implemented as an inter-device connection compatible with CAUI-4. For example, the receiver component 402 can be implemented as a multi-lane (e.g., 4-lane) 100GBASE-R protocol device. As such, the one or more data streams can be an aggregate data stream (e.g., an aggregate 100 G data stream) that comprises one or more physical lanes (e.g., a 100 G physical lane, two 50 G physical lanes, four 25 G physical lanes, five 20 G physical lanes, ten 10 G physical lanes, etc.).

The receiver component 402 can be configured to de-interleave the one or more data streams to generate a pseudo signal (e.g., PSEUDO SIGNAL shown in FIG. 4) at a data rate of a combined signal (e.g., a combined signal generated by an aggregation component 102). For example, the pseudo signal can correspond to the combined signal generated by the aggregation component 102. In one example, the receiver component 402 can de-interleave the one or more data streams generated by the transmitter component 104. In another example, the receiver component 402 can de-interleave one or more data streams generated by a different component. The pseudo signal can include a plurality of virtual lanes. In one example, the plurality of virtual lanes can be implemented as MLG lanes. In one non-limiting example, the plurality of virtual lanes can be pseudo-100 G virtual lanes.

The de-aggregation component 404 can be configured to revert the pseudo signal into a plurality of first signals and/or at least one second signal (e.g., SIGNAL_a-SIGNAL_n shown in FIG. 4). For example, the de-aggregation component 404 can decode the pseudo signal to acquire (e.g., obtain) the plurality of first signals and/or the at least one second signal received by the aggregation component 102. In another example, the de-aggregation component 404 can decode the pseudo signal to acquire a plurality of first signals received and/or generated by a different component. In an aspect, the de-aggregation component 404 can be configured to re-format the plurality of virtual lanes of the pseudo signal. In another aspect, the de-aggregation component 404 can de-map the plurality of first signals and/or the at least one second signal from a plurality of first modified signals and/or a plurality of second modified signals.

Figure 5:
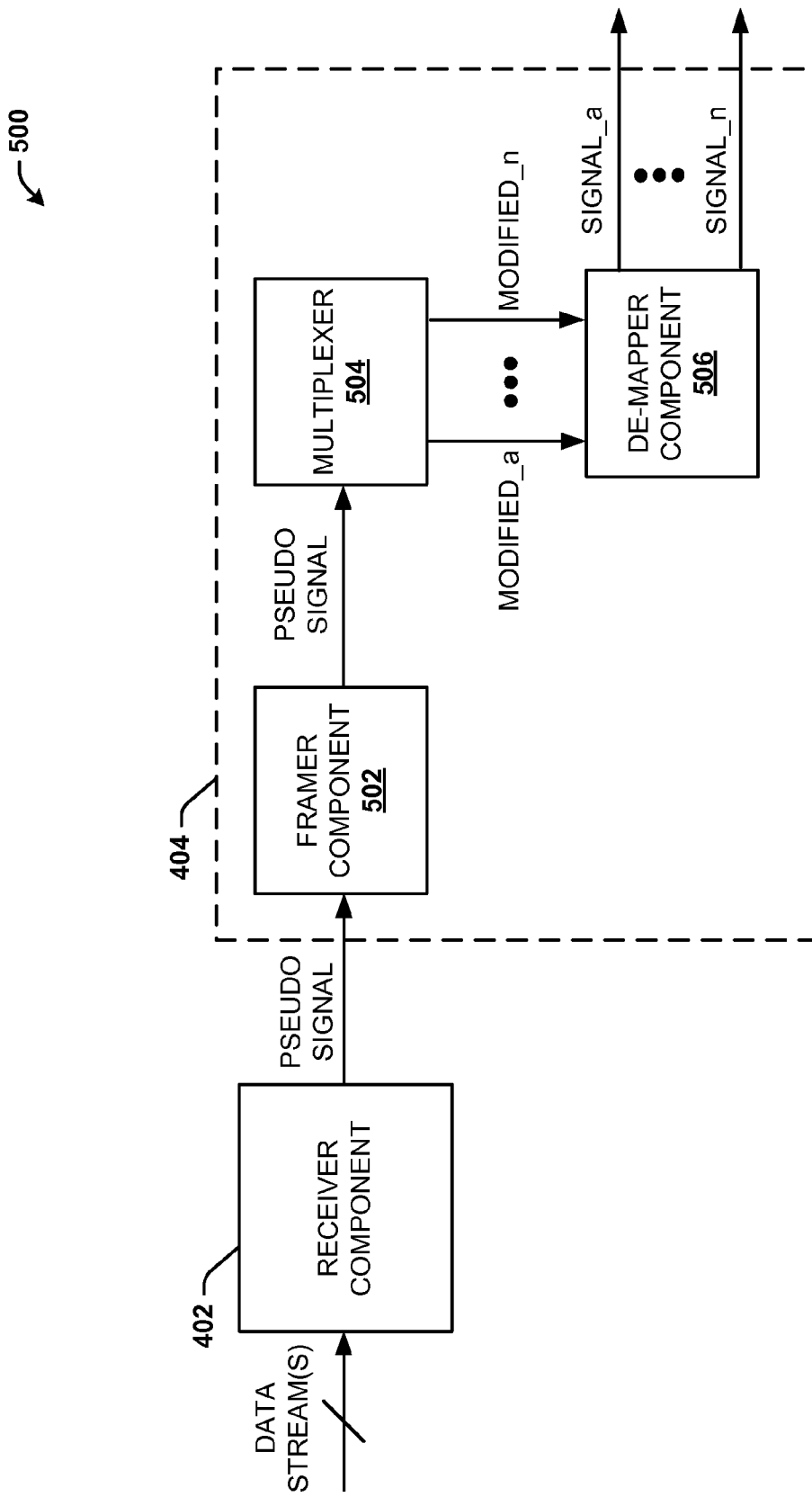
FIG. 5 is a block diagram illustrating an example, non-limiting embodiment of a de-aggregation component in accordance with various aspects described herein.

Referring now to FIG. 5, a block diagram illustrating an example, non-limiting embodiment of an aggregation component in accordance with various aspects described herein is shown. The de-aggregation component 404 can include at least a framer component 502, a multiplexer (e.g., multiplexer component) 504 and/or a de-mapper component 506. In one example, the framer component 502 can be implemented as an OTUFlex framer.

The framer component 502 can receive the pseudo signal (e.g., the plurality of virtual lanes). The framer component 502 can be configured to determine a start of frame position for each of the plurality of virtual lanes of the pseudo signal. For example, the framer component 502 can be configured to determine a start of frame position for each of the plurality of virtual lanes of the pseudo signal based on detection of a FAS field. Furthermore, the framer component 502 can implement a descrambler to obtain data from the pseudo signal. For example, the framer component 502 can descramble an AM field, a BIP-8 field, an OH field and/or a JUST field of the pseudo signal. As such, the framer component 502 can be configured to determine data included in the pseudo signal (e.g., the plurality of virtual lanes).

The multiplexer 504 can generate (e.g., reconstruct) a plurality of first modified signals and/or a plurality of second modified signals (e.g., MODIFIED_a-MODIFIED_n shown in FIG. 5) based on the pseudo signal (e.g., the plurality of virtual lanes). For example, the multiplexer 504 can reconstruct a modified signal based on a pair of virtual lanes of the pseudo signal that corresponds to the modified signal. In an aspect, the multiplexer 504 can multiplex blocks of data (e.g., blocks of 16 bytes) of a pair of virtual lanes of the pseudo signal into a modified signal (e.g., a single bit stream) based on a round-robin distribution scheme. For example, the multiplexer 504 can apply a first data block of a first virtual lane to a modified signal, a first data block of a second virtual lane to the modified signal, a second data block of the first virtual lane to the modified signal, a second data block of the second virtual lane to the modified signal, etc. As such, each block from a first virtual lane of a modified signal is followed by a next block from a second virtual lane of the modified signal to reconstruct the modified signal. The round-robin distribution scheme can be repeated until an end of a frame.

The de-mapper component 506 can generate a plurality of first signals and/or at least one second signal based on the plurality of first modified signals and/or the plurality of second modified signals. For example, each of the plurality of first signals can be de-mapped from the plurality of first modified signals and/or the at least one second signal can be de-mapped from the plurality of second modified signals. A data rate of the plurality of first signals can be less than a data rate of the plurality of first modified signals and/or a data rate of the at least one second signal can be less than a data rate of the plurality of second modified signals. As such, various signal types can be recovered, such as but not limited to, OTN, Ethernet, Fibre Channel and/or CBR, as long as each client rate is less that the payload rate supported by the OTUFlex signal.

Figure 6:
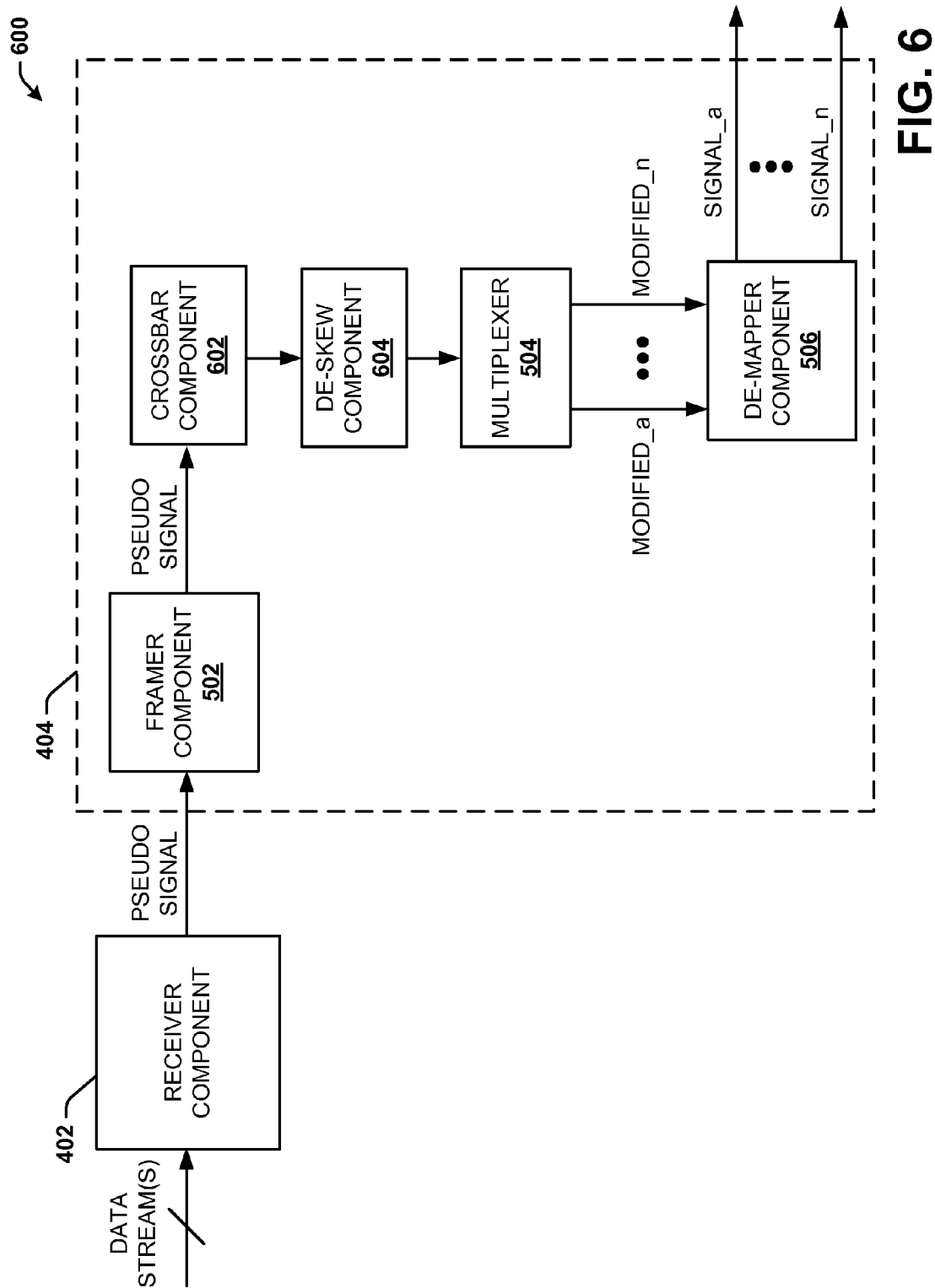
FIG. 6 is a block diagram illustrating another example, non-limiting embodiment of a de-aggregation component in accordance with various aspects described herein.

Referring now to FIG. 6, a block diagram illustrating another example, non-limiting embodiment of an aggregation component in accordance with various aspects described herein is shown. The de-aggregation component 404 can include at least the framer component 502, the multiplexer 504 and/or the de-mapper component 506. Additionally, the de-aggregation component 404 can include a crossbar component 602 and/or a de-skew component 604.

The crossbar component 602 can be implemented to map (e.g., arbitrarily map) each of the plurality of virtual lanes of the pseudo signal to a lane slot associated with the receiver component 402. For example, each pair of virtual lanes of the pseudo signal associated with the same modified signal can be grouped together.

The de-skew component 604 can facilitate re-ordering of a pair of virtual lanes of the pseudo signal based on a LSB of an AM field. For example, the de-skew component 604 can align each pair of virtual lanes of the pseudo signal such that an alignment marker pair occurs at the same point in time. As such, the de-skew component 604 can perform virtual lane alignment for a pair of virtual lanes as a function of a value stored in an AM field associated with the pair of virtual lanes. Therefore, the plurality of first modified signals and/or the plurality of second modified signals can be re-interleaved in a correct order. Accordingly, the de-skew component 604 can align pairs of virtual lanes (e.g., corresponding pairs of virtual lanes) while not aligning other virtual lanes.

Figure 7:
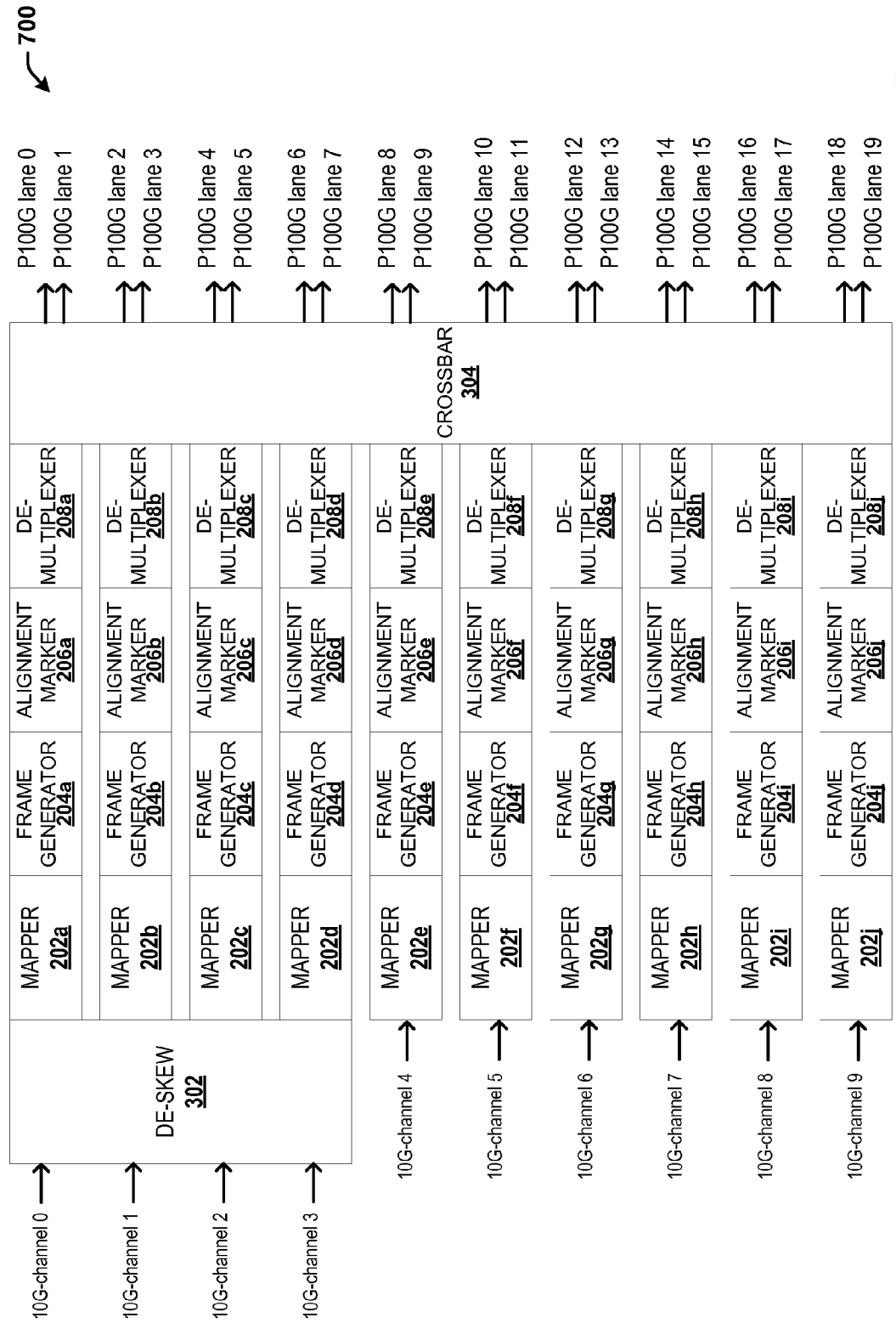
FIG. 7 is a block diagram illustrating yet another example, non-limiting embodiment of an aggregation component in accordance with various aspects described herein.

Referring now to FIG. 7, a block diagram illustrating an example, non-limiting embodiment of an aggregation component in accordance with various aspects described herein is shown. Aggregation component 700 includes de-skew (e.g., de-skew component) 302, mappers (e.g., mapper components) 202a-j, frame generators (e.g., frame generator components) 204a-j, alignment markers (e.g., alignment marker components) 206a-j, de-multiplexers 208a-j and/or crossbar (e.g., crossbar component) 304. In the non-limiting example shown in FIG. 7, the aggregation component 700 can receive ten 10 G signals (e.g., 10 G-channel 0 through 10 G-channel 9). For example, de-skew component 302 can receive signal 10 G-channel 0, signal 10 G-channel 1, signal 10 G-channel 2 and signal 10 G-channel 3. Signal 10 G-channel 0, signal 10 G-channel 1, signal 10 G-channel 2 and signal 10 G-channel 3 can be associated with a 40 G client. As such, the de-skew component 302 can align signal 10 G-channel 0, signal 10 G-channel 1, signal 10 G-channel 2 and signal 10 G-channel 3 prior to being transmitted to a corresponding mapper component 202a-d. Signal 10 G-channel 4, signal 10 G-channel 5, signal 10 G-channel 6, signal 10 G-channel 7, signal 10 G-channel 8 and signal 10 G-channel 9 can be directly received by respective mapper components 202e-j.

Mapper components 202a-j can map respective signals 10 G-channel 0 through 10 G-channel 9 into a plurality of container signals. For example, mapper component 202a can map signal 10 G-channel 0 into a first container signal, mapper component 202b can map signal 10 G-channel 1 into a second container signal, etc. Furthermore, frame generator components 204a-j can generate a plurality of modified signals based on the plurality of container signals. For example, frame generator component 204a can generate a first modified signal based on the first container signal, frame generator component 204b can generate a second modified signal based on the second container signal, etc.

The alignment marker component 206a-j can insert a lane alignment marker to an AM field of each of the plurality of modified signals. For example, the alignment marker component 206a can insert a first lane alignment marker to an AM field of the first modified signal, the alignment marker component 206b can insert a second lane alignment marker to an AM field of the second modified signal, etc. The de-multiplexers 208a-j can de-multiplex each of the plurality of modified signals into a first virtual lane and a second virtual lane (e.g., a pair of virtual lanes). For example, the de-multiplexer 208a can de-multiplex the first modified signal into a virtual lane P100 G lane 0 and a virtual lane P100 G lane 1, the de-multiplexer 208b can de-multiplex the second modified signal into a virtual lane P100 G lane 2 and a virtual lane P100 G lane 3, etc. As such, the de-multiplexer 208a-j can generate a plurality of virtual lanes P100 G lane 0 through P100 G lane 19 based on the plurality of modified signals. The plurality of virtual lanes P100 G lane 0 through P100 G lane 19 can be implemented as a combined signal (e.g., a pseudo-100 G signal). For example, a combined signal can include the plurality of virtual lanes P100 G lane 0 through P100 G lane 19. The plurality of virtual lanes P100 G lane 0 through P100 G lane 19 can be synchronous to a common clock domain. As such, a set of ten 10 G channels can look like 20 virtual lanes of a 100 G channel.

In a non-limiting example, the aggregation component 700 can rate-adapt each 10 G channel via one or more mapping algorithms to generate a corresponding 10 G modified signal (e.g., a 10 G OTUFlex signal). The aggregation component 700 can reformat each 10 G modified signal into a pair of pseudo-100 G lanes (e.g., pseudo-100 G virtual lanes). As such, the set of ten 10 G channels can appear as 20 lanes of a 100 G channel (e.g., a combined signal, a pseudo-100 G (or P100 G) channel, etc.). In addition, the aggregation component 700 can rate adapt a 40 G channel (e.g., via mapping each 10 G PCS or OTL lane into a 10 G modified signal). For example, the 40 G channel can be formatted as a XLAUI or OTL3.4 signal. As such, the 40 G channel can include four 10 G PCS or OTL lanes. Therefore, the 40 G channel can be formatted similar to a 10 G channel. Accordingly, each 10 G PCS or OTL lane can be reformatted into a pair of pseudo-100 G (virtual) lanes to generate eight virtual lanes per 40 G channel.

Figure 8:
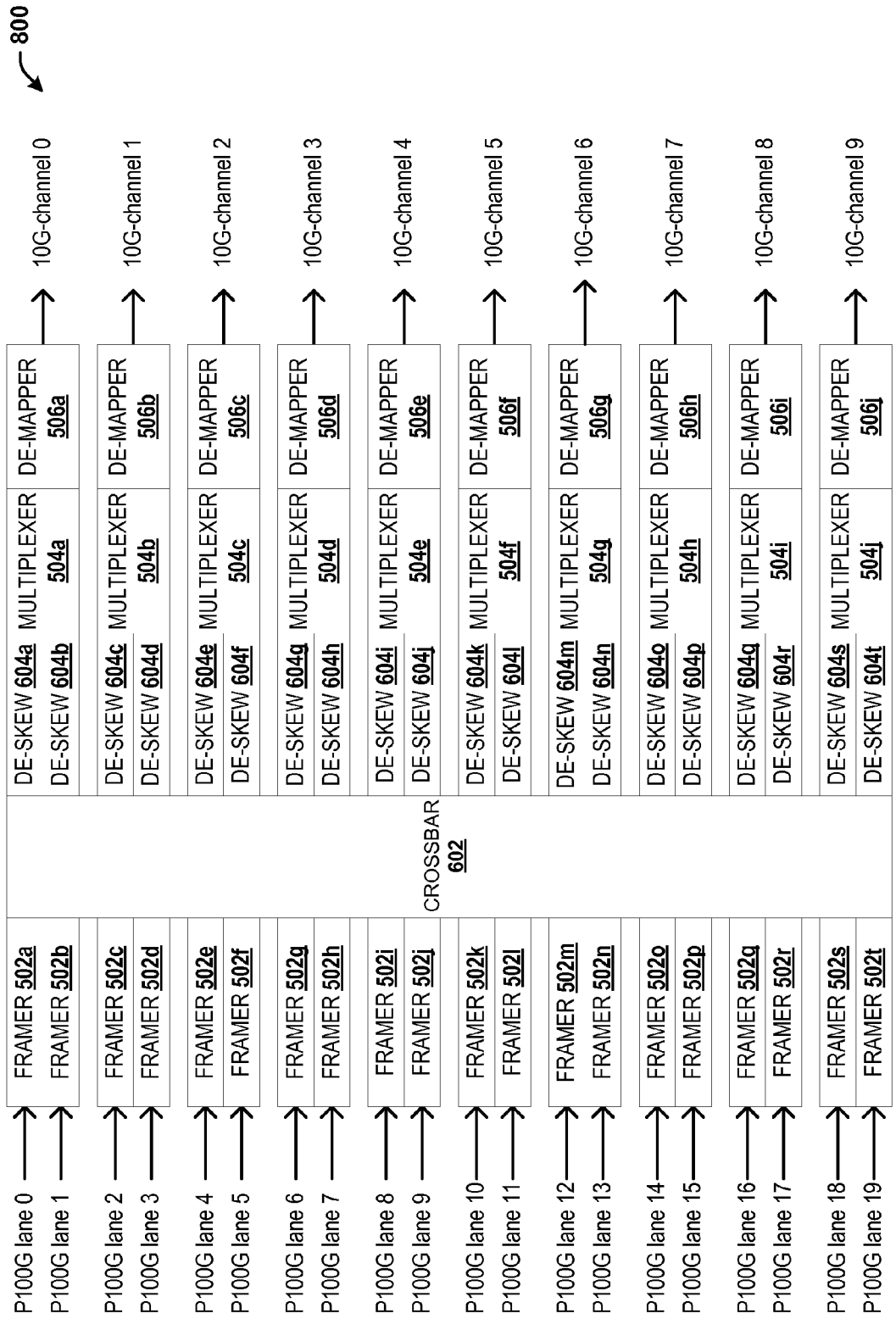
FIG. 8 is a block diagram illustrating yet another example, non-limiting embodiment of a de-aggregation component in accordance with various aspects described herein.

Referring now to FIG. 8, a block diagram illustrating an example, non-limiting embodiment of a de-aggregation component in accordance with various aspects described herein is shown. De-aggregation component 800 includes framers (e.g., framer components) 502a-t, crossbar (e.g., crossbar component) 602, de-skew (e.g., de-skew components) 604a-t, multiplexers 504a-j and/or de-mappers (e.g., de-mapper components) 506a-j. In the non-limiting example shown in FIG. 8, the de-aggregation component 800 can receive a plurality of virtual lanes P100 G lane 0 through P100 G lane 19. The plurality of virtual lanes P100 G lane 0 through P100 G lane 19 can be implemented as a combined signal (e.g., a pseudo-100 G signal). For example, a combined signal can include the plurality of virtual lanes P100 G lane 0 through P100 G lane 19. The plurality of virtual lanes P100 G lane 0 through P100 G lane 19 can be synchronous to a common block domain.

Each of the framer components 502a-t can receive a respective virtual lane P100 G lane 0 through P100 G lane 19. For example, the framer component 502a can receive the virtual lane P100 G lane 0, the framer component 502b can receive the virtual lane P100 G lane 1, etc. The framer components 502a-t can determine a start of frame position (e.g., based on a FAS field) for respective virtual lanes P100 G lane 0 through P100 G lane 19. For example, the framer component 502a can determine a start of frame position for a virtual lane P100 G lane 0, the framer component 502b can determine a start of frame position for a virtual lane P100 G lane 1, etc. Furthermore, the framer components 502a-t can descramble data (e.g., re-assembled data) associated with the combined signal (e.g., the pseudo-100 G signal). For example, the framer component 502a and/or the framer component 502b can descramble data associated with virtual lane P100 G lane 0 and/or the virtual lane P100 G lane 1, the framer component 502c and/or the framer component 502d can descramble data associated with virtual lane P100 G lane 2 and/or the virtual lane P100 G lane 3, etc. In an aspect, the framer components 502a-t can descramble data included in an AM field, a BIP-8 field, an OH field and/or a JUST field of the virtual lanes P100 G lane 0 through P100 G lane 19.

The crossbar component 602 can map (e.g., arbitrarily map) each of the plurality of virtual lanes P100 G lane 0 through P100 G lane 19 to a lane slot of a receiver component 402. The de-skew components 604a-t can align each pair of virtual lanes such that an alignment marker pair occurs at a proper point in time (e.g., an alignment pair can be offset). For example, the de-skew component 604a and/or the de-skew component 604b can align the virtual lane P100 G lane 0 and the virtual lane P100 G lane 1, the de-skew component 604c and/or the de-skew component 604d can align the virtual lane P100 G lane 2 and the virtual lane P100 G lane 3, etc. Accordingly, the de-skew components 604a-t can align each pair of virtual lanes such that data for each pair of virtual lanes is aligned.

The multiplexers 504a-j can multiplex virtual lane pairs to generate a single bit stream (e.g., a single signal). For example, the multiplexer 504a can multiplex the virtual lane P100 G lane 0 and the virtual lane P100 G lane 1 to generate a modified signal (e.g., MODIFIED_a), the multiplexer 504b can multiplex the virtual lane P100 G lane 2 and the virtual lane P100 G lane 3 to generate another modified signal (e.g., MODIFIED_b), etc. As such, the multiplexers 504a-j can generate a plurality of modified signals based on the plurality of virtual lanes P100 G lane 0 through P100 G lane 19.

The de-mapper components 506a-j can generate ten 10 G signals (e.g., 10 G-channel 0 through 10 G-channel 9) based on the plurality of modified signals. For example, the de-mapper component 506a can generate a signal 10 G-channel 0 based on a modified signal (e.g., MODIFIED_a), the de-mapper component 506b can generate a signal 10 G-channel 1 based on another modified signal (e.g., MODIFIED_b), etc. As such, the de-aggregation component 404 can recover a plurality of signals (e.g., the signals 10 G-channel 0 through 10 G-channel 9) encoded in the plurality of virtual lanes (e.g., virtual lanes P100 G lane 0 through P100 G lane 19).

In a non-limiting example, the de-aggregation component 800 can re-format each pair of pseudo-100 G lanes into a single 10 G modified signal (e.g., a single OTUFlex channel). As such, the combined signal (e.g., the pseudo-100 G channel) can be reverted into ten 10 G channels. The de-aggregation component 800 can then de-map an original 10 G channel from a 10 G modified signal. In an example where an original signal was a 40 G signal, the de-aggregation component 800 can re-format each pair of pseudo-100 G lanes into a 10 G modified signal for the group of eight virtual lanes corresponding to the 40 G channel. The de-aggregation component 800 can then de-map each OTL lane from the modified signal. Accordingly, the original four PCS or OTL3.4 lanes can be reproduced.

Figure 9:
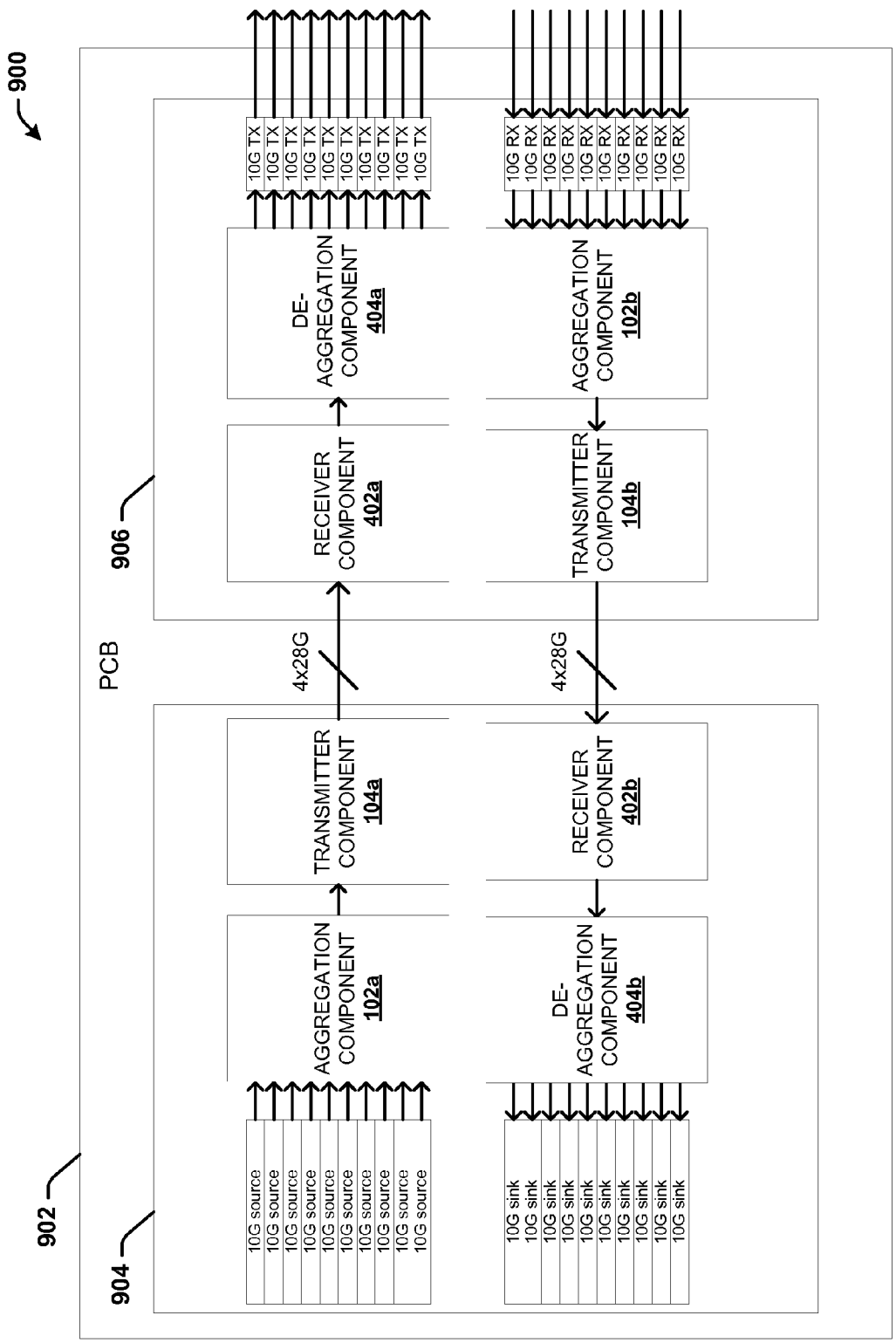
FIG. 9 is a block diagram illustrating an example, non-limiting embodiment of a printed circuit board system in accordance with various aspects described herein.

Referring now to FIG. 9, a block diagram illustrating an example, non-limiting embodiment of devices in a network system in accordance with various aspects described herein is shown. System 900 includes a component 902, a component 904 and component 906. In one example, component 902 can be a PCB. In one example, component 904 can be an ASIC. In one example, component 906 can be a 100 G module. The component 902 can include the component 904 and the component 906. The component 904 can include an aggregation component 102a, a transmitter component 104a, a receiver component 402b and a de-aggregation component 404b. The component 906 can include a receiver component 402a, a de-aggregation component 404a, an aggregation component 102b and a transmitter component 104b. In an aspect, the component 904 and the component 906 can communicate via a system interface associated with CAUI-4 (e.g., an inter-device connection compatible with CAUI-4). However, it is to be appreciated that the component 904 and the component 906 can communicate via a different type of interface.

In a transmit direction (e.g., a top path shown in FIG. 9) of the non-limiting example shown in FIG. 9, a set of ten 10 G channels (e.g., as set of ten 10 G source signals) are converted by the aggregation component 102a to form a set of 20 pseudo-100 G lanes (e.g., 20 virtual lanes). The pseudo-100 G lanes can be bit interleaved by the transmitter component 104a (e.g., a transmitter component associated with an improved CAUI-4 protocol) to form four physical lanes. Each of the four physical lanes can include a data rate of 28 Gbps. The four physical lanes can be transmitted to the receiver component 402a (e.g., a receiver device associated with an improved CAUI-4 protocol). The receiver component can be implemented on the component 906 (e.g., an attached 100 G module). The receiver component 402a implemented on the component 906 (e.g., the 100 G module) can bit de-interleave the 20 pseudo-100 G lanes. The de-aggregation component 404a can generate (e.g., obtain) a 10 G channel from each pair of pseudo-100 G lanes. The component 906 (e.g., the 100 G module) can then transmit each 10 G channel via a physical medium attachment (PMA) transmission protocol and/or a physical medium dependent (PMD) transmission protocol over a 10 G link.

In a receive direction (e.g., a bottom path shown in FIG. 9) of the non-limiting example shown in FIG. 9, a set of ten independent 10 G links can be received via a PMA transmission protocol and/or a PMD transmission protocol. Furthermore a set of ten 10 G channels associated with the set of ten independent 10 G links can be sent to the aggregation component 102b. The ten 10 G channels can be converted by the aggregation component 102b to form a set of 20 pseudo-100 G lanes. The pseudo-100 G lanes can be interleaved by the transmission component 104b (e.g., a transmitter component associated with an improved CAUI-4 protocol) to form four physical lanes. The four physical lanes can each include a data rate of 28 Gbps. The four physical lanes can be transmitted to the receiver component 402b (e.g. a receiver component associated with an improved CAUI-4 protocol) implemented on the component 904 (e.g., an attached 100 G device). The receiver component 402b implemented on the component 904 (e.g., the 100 G device) can de-interleave the 20 pseudo-100 G lanes (e.g., the 20 virtual lanes). The de-aggregation component 404b can revert each pair of pseudo-100 G lanes to a 10 G channel (e.g., as set of ten 10 G sink signals). The component 904 (e.g., the 100 G device) can then terminate each of the 10 G channels as required by each channel application.

As such, the system 900 can facilitate timing transparency of client signals between the component 904 and the component 906. For example, each of the set of ten 10 G source signals received by the aggregation component 102a, as well as clocking of each of the set of ten 10 G source signals, can be reproduced (e.g., recovered) by the component 906. Furthermore, each of the set of ten independent 10 G links received by the aggregation component 102b can be reproduced (e.g., recovered) by the component 904. In addition, the system 900 can facilitate data transparency of client signals between the component 904 and the component 906. For example, each bit of the set of ten 10 G source signals received by the aggregation component 102a can be transmitted to the component 906 without being altered. Furthermore, each bit of the set of ten independent 10 G links received by the aggregation component 102b can be transmitted to the component 904 without being altered. It is to be appreciated that each 10 G line signal pair (e.g., RX and TX) can be an independent link terminated by an independent and/or remote receiver.

Figure 10:
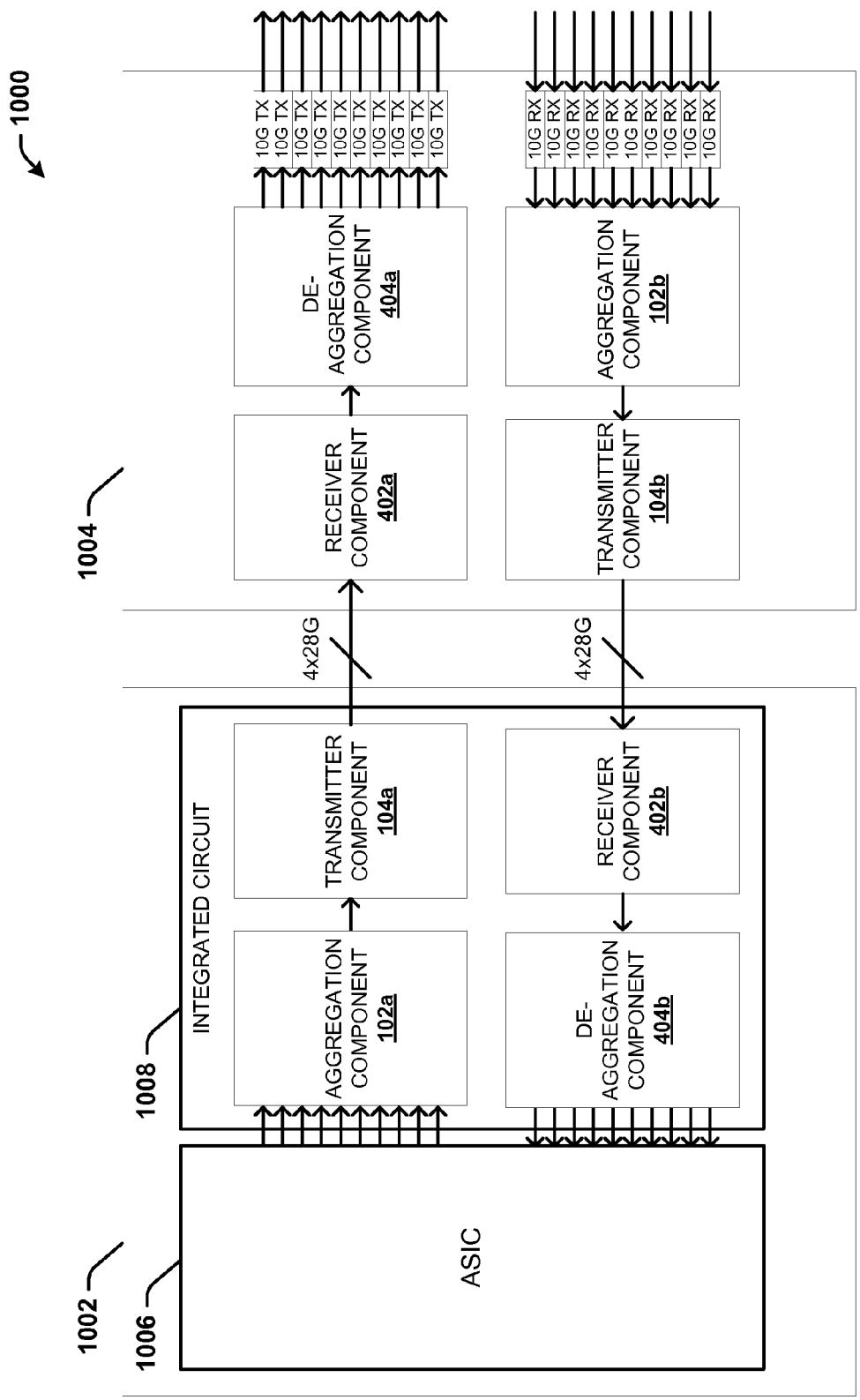
FIG. 10 is a block diagram illustrating an example, non-limiting embodiment of a chassis system in accordance with various aspects described herein.

Referring now to FIG. 10, a block diagram illustrating an example, non-limiting embodiment of devices in a network system in accordance with various aspects described herein is shown. System 1000 includes a component 1002 and component 1004. In one example, component 1002 and/or component 1004 can be a chassis device (e.g., a server). In another example, component 1002 and/or component 1004 can be a network box. Component 1002 can include an ASIC 1006 and an integrated circuit 1008. In one example, the integrated circuit 1008 can be an MLG-OTN integrated circuit. In an aspect, the ASIC 1006 and the integrated circuit 1008 can communicate via a system interface associated with CAUI-10 (e.g., an inter-device connection compatible with CAUI-10). However, it is to be appreciated that the ASIC 1006 and the integrated circuit 1008 can communicate via a different type of interface. Integrated circuit 1008 can include an aggregation component 102a, a transmission component 104a, a receiver component 402b and a de-aggregation component 404b. Component 1004 can include a receiver component 402a, a de-aggregation component 404a, an aggregation component 102b and a transmitter component 104b. In one example, the component 1002 (e.g., the integrated circuit 1008) and the component 1004 can be coupled via an optical link (e.g., an OTN link). In another example, the component 1002 (e.g., the integrated circuit 1008) and the component 1004 can be coupled via an electrical link. In an aspect, the component 1002 (e.g., the integrated circuit 1008) and the component 1004 can communicate via a chassis-to-chassis interface.

In a transmit direction (e.g., a top path shown in FIG. 10) of the non-limiting example shown in FIG. 10, a set of two 40 G channels can be converted by the aggregation component 102a to form a set of 16 pseudo-100 G virtual lanes. In one example, the remaining four virtual lanes can carry an AM signal in order to indicate absence of clients. In another example, the remaining four virtual lanes can be used if an additional two 10 G channels received by the aggregation component 102a. In one example, the ASIC 1006 can generate the set of two 40 G channels and/or the additional two 10 G channels. The pseudo-100 G lanes can be bit interleaved by the transmitter component 104a (e.g., a transmitter component associated with an improved CAUI-4 protocol) to form four physical lanes. The four physical lanes can each include a data rate of approximately 28 Gbps. The four physical lanes can be transmitted to the receiver component 402a (e.g., a receiver component associated with an improved CAUI-4 protocol) implemented on the component 1004. The receiver component 402 can de-interleave the 20 pseudo-100 G lanes. The de-aggregation component 404a can revert each pair of pseudo-100 G lanes to a 10 G PCS lane (e.g., for a 40 GE protocol) or an OTL lane (e.g., for an OTN protocol) in order to reconstruct the original 40 G channel. The module then transmits each 40 G channel via a PMA transmission protocol and/or a PMD transmission protocol over a 10 G link.

In a receive direction (e.g., a bottom path shown in FIG. 10) of the non-limiting example shown in FIG. 10, a set of ten independent 10 G links can be received via a PMA transmission protocol and/or a PMD transmission protocol. Furthermore a set of ten 10 G channels associated with the set of ten independent 10 G links can be sent to the aggregation component 102b. The ten 10 G channels can be converted by the aggregation component 102b to form a set of 20 pseudo-100 G lanes. The pseudo-100 G lanes can be interleaved by the transmission component 104b (e.g., a transmitter component associated with an improved CAUI-4 protocol) to form four physical lanes. The four physical lanes can each include a data rate of 28 Gbps. The four physical lanes can be transmitted to the receiver component 402b (e.g. a receiver component associated with an improved CAUI-4 protocol) implemented on the integrated circuit 1008. The receiver component 402b implemented on the integrated circuit 1008 can de-interleave the 20 pseudo-100 G lanes (e.g., the 20 virtual lanes). The de-aggregation component 404b can generate (e.g., obtain) a 10 G channel from each pair of pseudo-100 G lanes. The integrated circuit 1008 can then terminate each of the 10 G channels as required by each channel application. In an aspect, every four 10 G channels that correspond to a 40 G signal can be processed as a group.

As such, the system 1000 can facilitate timing transparency of client signals between the component 1002 and the component 1004. For example, each of the set of ten 10 G source signals received by the aggregation component 102a can be reproduced (e.g., recovered) by the component 1004. Furthermore, each of the set of ten independent 10 G links received by the aggregation component 102b can be reproduced (e.g., recovered) by the component 1002. In addition, the system 1000 can facilitate data transparency of client signals between the component 1002 and the component 1004. For example, each bit of the set of ten 10 G source signals received by the aggregation component 102a can be transmitted to the component 1004 without being altered. Furthermore, each bit of the set of ten independent 10 G links received by the aggregation component 102b can be transmitted to the component 1002 without being altered. It is to be appreciated that each 10 G line signal pair (e.g., RX and TX) can be an independent link terminated by an independent and/or remote receiver.

In view of the example systems described above, methods that may be implemented in accordance with the described subject matter may be better appreciated with reference to the flow charts of FIGS. 11-14. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 11:
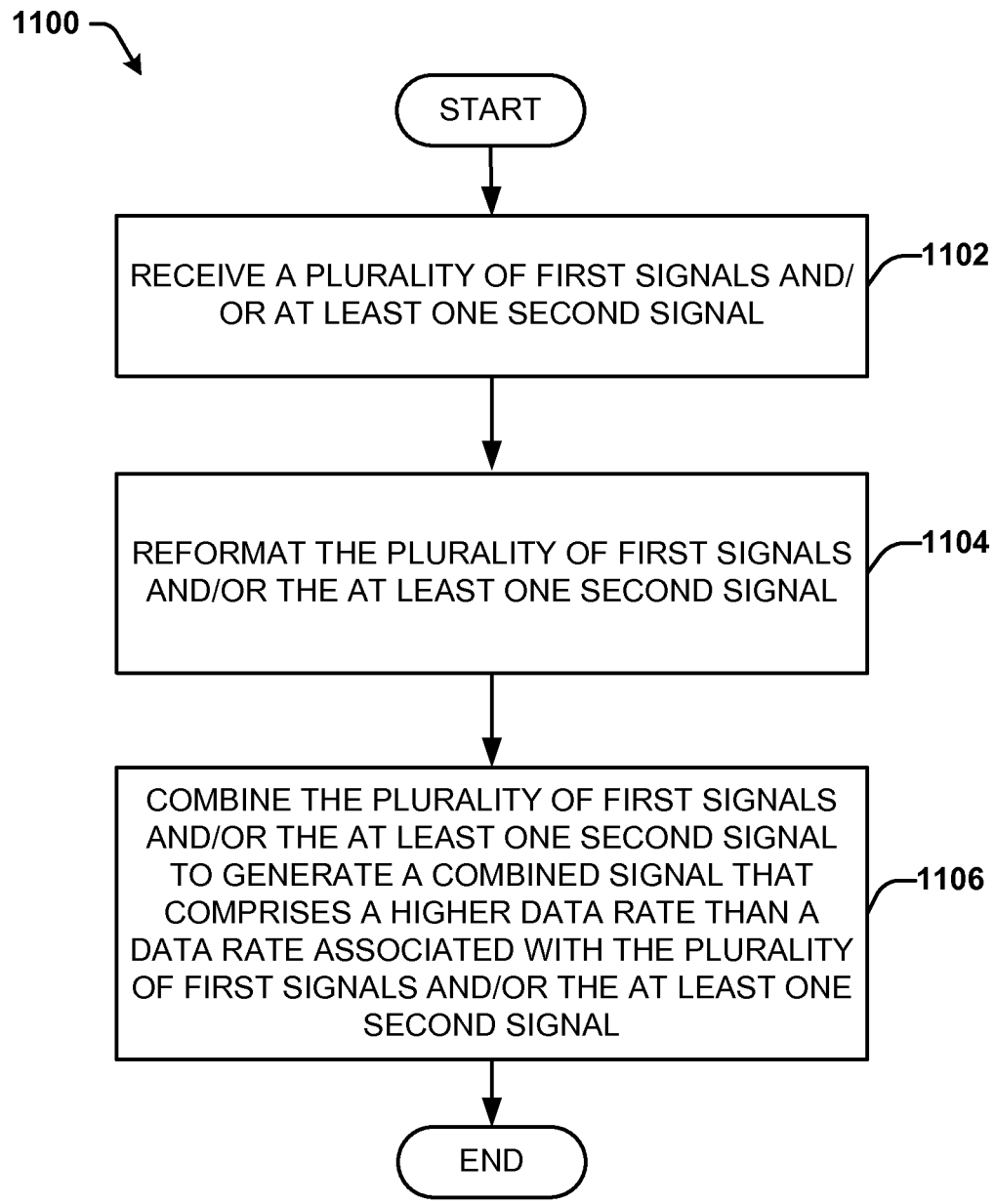
FIG. 11 illustrates a flow diagram of an example, non-limiting embodiment of a method for aggregating a plurality of signals.

Referring now to FIG. 11, a flow diagram of an example, non-limiting embodiment of a method for aggregating a plurality of signals is shown. Method 1100 can begin at block 1102, where a plurality of first signals and/or at least one second signal are received (e.g., using an aggregation component 102). For example, a plurality of first signals that include a first data rate (e.g., 10 G) and/or at least one second signal that includes a second data rate (e.g., 40 G) can be received. Furthermore, the plurality of first signals and/or the at least one second signal can include one or more signal types (e.g., OTN, Ethernet, FC, synchronous optical networking, CBR and/or other signal types).

At block 1104, the plurality of first signals and/or the at least one second signal are reformatted (e.g., using an aggregation component 102). For example, a plurality of first container signals can be generated based on the plurality of first signals and/or a plurality of second container signals can be generated based on the at least one second signal. In one example, the at least one second signal can be partitioned into one or more tributary signals (e.g., one or more sub-signals). As such, the plurality of second container signals can be generated based on the one or more tributary signals. In an aspect, the plurality of first signals can be mapped (e.g., using one or more mapping algorithms) to the plurality of first container signals and/or the at least one second signal (e.g., the one or more tributary signals) can be mapped (e.g., using one or more mapping algorithms) to the plurality of second container signals. Furthermore, a plurality of first modified signals can be generated based on the plurality of first container signals and/or a plurality of second modified signals can be generated based on the plurality of second container signals. In an aspect, each of the plurality of first modified signals can include one or more data fields (e.g., at least a data field to store a respective first container signal) and/or each of the plurality of second modified signals can include one or more data fields (e.g., at least a data field to store a respective second container signal).

At 1106, the plurality of first signals and/or the at least one second signal are combined (e.g., using an aggregation component 102) to generate a combined signal that comprises a higher data rate than a data rate associated with the plurality of first signals and/or the at least one second signal. For example, the combined signal can include a plurality of virtual lanes. The plurality of virtual lanes can include a plurality of pairs of virtual lanes. Each of the plurality of pairs of virtual lanes can be associated with a modified signal (e.g., a modified signal from the plurality of first modified signals and/or the plurality of second modified signals).

Figure 12:
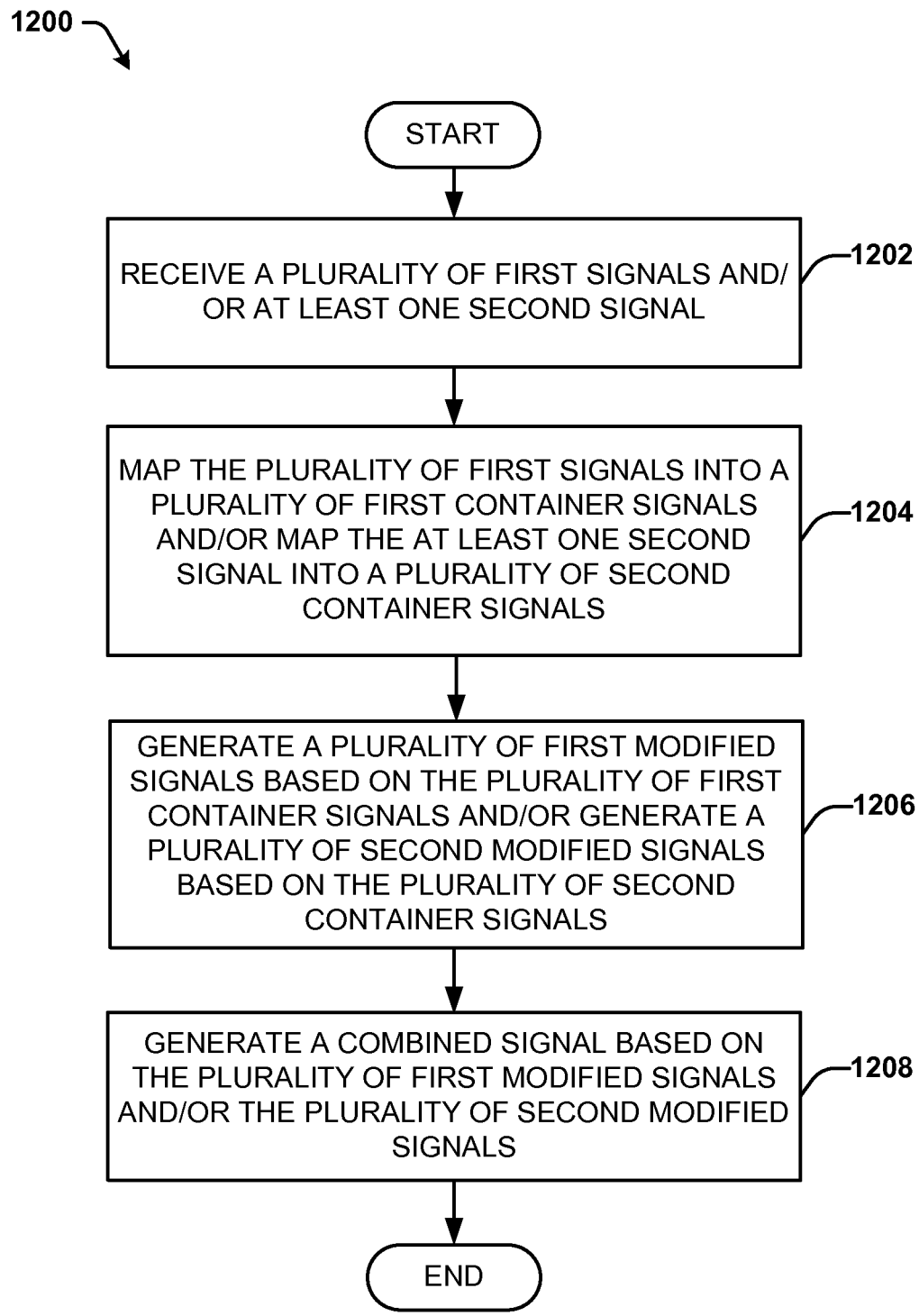
FIG. 12 illustrates a flow diagram of another example, non-limiting embodiment of a method for reformatting and/or aggregating a plurality of signals.

Referring now to FIG. 12, a flow diagram of an example, non-limiting embodiment of a method for reformatting and/or aggregating a plurality of signals is shown. Method 1200 can begin at block 1202, where a plurality of first signals and/or at least one second signal are received (e.g., using a mapper component 202 and/or a de-skew component 302).

At block 1204, the plurality of first signals are mapped (e.g., using a mapper component 202) into a plurality of first container signals and/or the at least one second signal is mapped (e.g., using a mapper component 202) into a plurality of second container signals.

At block 1206, a plurality of first modified signals are generated (e.g., using a frame generator component 204) based on the plurality of first container signals and/or a plurality of second modified signals are generated (e.g., using a frame generator component 204) based on the plurality of second container signals.

At 1208, a combined signal (e.g., using a de-multiplexer 208) is generated based on the plurality of first modified signals and/or the plurality of second modified signals. In an aspect, a plurality of virtual lanes of a combined signal is generated based on the plurality of first modified signals and/or the plurality of second modified signals.

Figure 13:
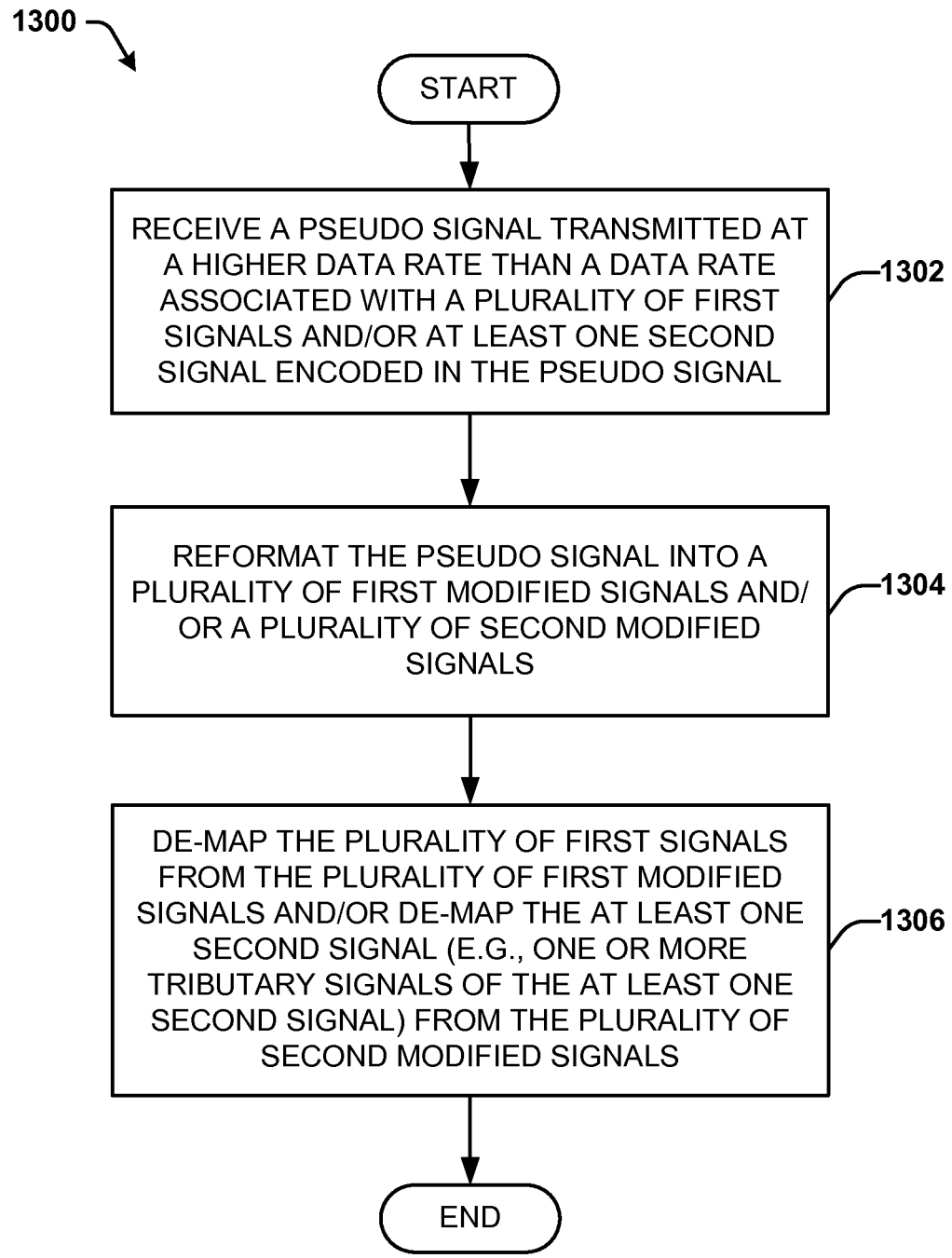
FIG. 13 illustrates a flow diagram of yet another example, non-limiting embodiment of a method for reformatting and/or de-aggregating a plurality of virtual lanes of a combined signal.

Referring now to FIG. 13, a flow diagram of an example, non-limiting embodiment of a method for reformatting and/or de-aggregating a plurality of virtual lanes of a combined signal is shown. Method 1300 can begin at block 1302, where a pseudo signal transmitted at a higher data rate than a data rate associated with a plurality of first signals and/or at least one second signal encoded in the pseudo signal is received (e.g., by a framer component 502). In one non-limiting example, the plurality of first signals can be a plurality of 10 G signals and the at least one second signal can be at least one 40 G signal. At 1304, the pseudo signal is reformatted (e.g., using a framer component 502 and/or a multiplexer 504) into a plurality of first modified signals and/or a plurality of second modified signals. For example, the plurality of first modified signals can be a plurality of 10 G container signals generated based on the plurality of first signals and/or the plurality of second modified signals can be a plurality of 10 G container signals generated based on the at least one second signal. At 1306, the plurality of first signals are de-mapped from the plurality of first modified signals (e.g., using a de-mapper component 506) and/or the at least one second signal (e.g., one or more tributary signals of the at least one second signal) is de-mapped from the plurality of second modified signals (e.g., using a de-mapper component 506). For example, the plurality of 10 G signals can be de-mapped from the plurality of first modified signals. Furthermore, four 10 G tributary signals that can be utilized to reconstruct the at least one 40 G signal can be de-mapped from the plurality of second modified signals.

Figure 14:
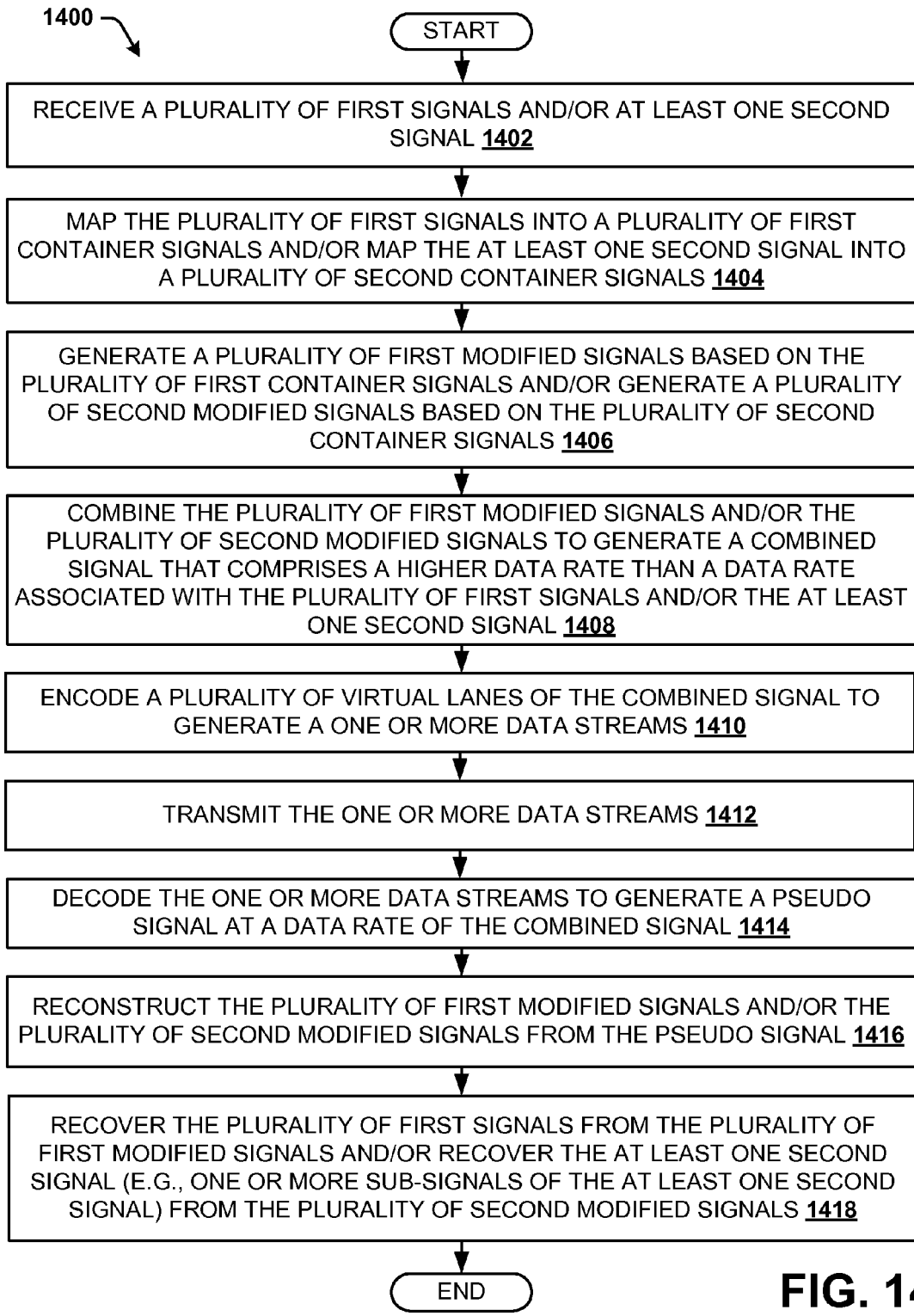
FIG. 14 illustrates a flow diagram of yet another example, non-limiting embodiment of a method for aggregating and de-aggregating a plurality of signals.

Referring now to FIG. 14, a flow diagram of an example, non-limiting embodiment of a method for aggregating and de-aggregating a plurality of signals is shown. Method 1400 can begin at block 1402, where a plurality of first signals and/or at least one second signal are received (e.g., by an aggregation component 102). At 1404, the plurality of first signals are mapped (e.g., using an aggregation component 102) into a plurality of first container signals and/or the at least one second signal is mapped (e.g., an aggregation component 102) into a plurality of second container signals. At 1406, a plurality of first modified signals are generated (e.g., using an aggregation component 102) based on the plurality of first container signals and/or a plurality of second modified signals are generated (e.g., using an aggregation component 102) based on the plurality of second container signals. At 1408, the plurality of first modified signals and/or the plurality of second modified signals are combined (e.g., using an aggregation component 102) to generate a combined signal that comprises a higher data rate than a data rate associated with the plurality of first signals and/or the at least one second signal. At 1410, a plurality of virtual lanes of the combined signal are encoded (e.g., using a transmitter component 104) to generate one or more data streams. At 1412, the one or more data streams are transmitted (e.g., using a transmitter component 104). At 1414, the one or more data streams are decoded (e.g., using a receiver component 402) to generate a pseudo signal at a data rate of the combined signal. At 1416, the plurality of first modified signals and/or the plurality of second modified signals are reconstructed from the pseudo signal (e.g., using a multiplexer 502). At 1418, the plurality of first signals are recovered from the plurality of first modified signals (e.g., using a de-mapper component 506) and/or the at least one second signal (e.g., one or more sub-signals of the at least one second signal) are recovered from the plurality of second modified signals (e.g., using a de-mapper component 506).

Example Computing Environment

Figure 15:
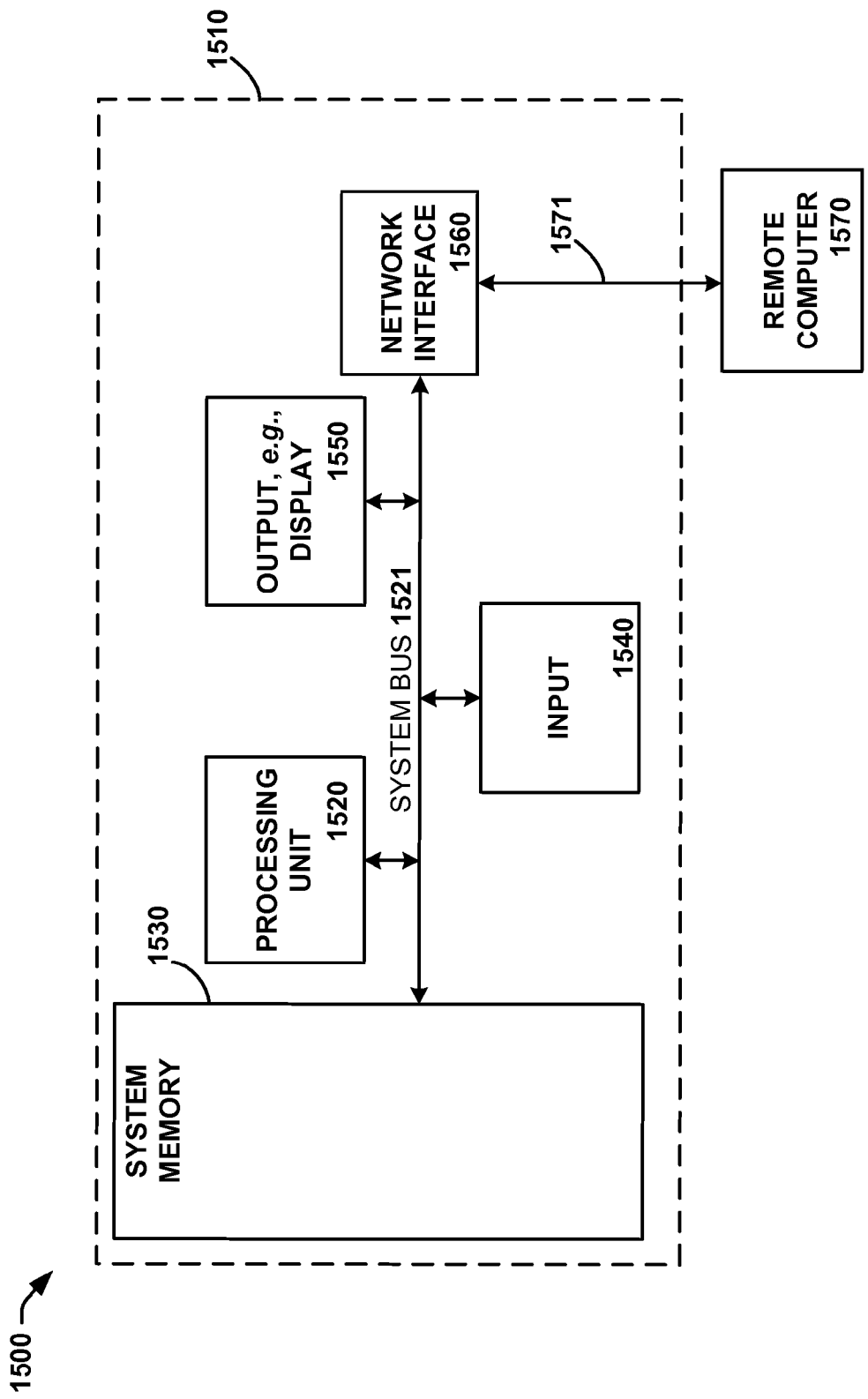
FIG. 15 illustrates a block diagram of an example electronic computing environment that can be implemented in conjunction with one or more aspects described herein.

As mentioned, advantageously, the techniques described herein can be applied to any device and/or network where it is desirable to employ a plurality of signals (e.g., a plurality of signal types and/or a plurality of signal data rates). It is to be understood, therefore, that handheld, portable and other computing devices and computing objects of all kinds are contemplated for use in connection with the various non-limiting embodiments. Accordingly, the below general purpose remote computer described below in FIG. 15 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 15 thus illustrates an example of a suitable computing system environment 1500 in which some aspects of the disclosed subject matter can be implemented, although as made clear above, the computing system environment 1500 is only one example of a suitable computing environment for a device and is not intended to suggest any limitation as to the scope of use or functionality of the disclosed subject matter. Neither should the computing environment 1500 be interpreted as having any dependency or requirement relating to any one or combination of components illustrated in the exemplary operating environment 1500.

With reference to FIG. 15, an exemplary device for implementing the disclosed subject matter includes a general-purpose computing device in the form of a computer 1510. Components of computer 1510 may include, but are not limited to, a processing unit 1520, a system memory 1530, and a system bus 1521 that couples various system components including the system memory to the processing unit 1520. The system bus 1521 may be any of several types of bus structures including a memory bus or memory controller, a peripheral bus, and a local bus using any of a variety of bus architectures.

Computer 1510 typically includes a variety of computer readable media. Computer readable media can be any available media that can be accessed by computer 1510. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1510. Communication media typically embodies computer readable instructions, data structures, program modules, or other data in a modulated data signal such as a carrier wave or other transport mechanism and includes any information delivery media.

The system memory 1530 may include computer storage media in the form of volatile and/or nonvolatile memory such as read only memory (ROM) and/or random access memory (RAM). A basic input/output system (BIOS), containing the basic routines that help to transfer information between elements within computer 1510, such as during start-up, may be stored in memory 1530. Memory 1530 typically also contains data and/or program modules that are immediately accessible to and/or presently being operated on by processing unit 1520. By way of example, and not limitation, memory 1530 may also include an operating system, application programs, other program modules, and program data.

The computer 1510 may also include other removable/non-removable, volatile/nonvolatile computer storage media. For example, computer 1510 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1521 through a non-removable memory interface such as an interface, and a magnetic disk drive or optical disk drive is typically connected to the system bus 1521 by a removable memory interface, such as an interface.

A user can enter commands and information into the computer 1510 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1520 through user input 1540 and associated interface(s) that are coupled to the system bus 1521, but may be connected by other interface and bus structures, such as a parallel port, game port, or a universal serial bus (USB). A graphics subsystem can also be connected to the system bus 1521. A projection unit in a projection display device, or a HUD in a viewing device or other type of display device can also be connected to the system bus 1521 via an interface, such as output interface 1550, which may in turn communicate with video memory. In addition to a monitor, computers can also include other peripheral output devices such as speakers which can be connected through output interface 1550.

The computer 1510 can operate in a networked or distributed environment using logical connections to one or more other remote computer(s), such as remote computer 1570, which can in turn have media capabilities different from device 1510. The remote computer 1570 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1510. The logical connections depicted in FIG. 15 include a network 1571, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1510 can be connected to the LAN 1571 through a network interface 1560 or adapter. When used in a WAN networking environment, the computer 1510 can typically include a communications component, such as a modem, or other means for establishing communications over the WAN, such as the Internet. A communications component, such as wireless communications component, a modem and so on, which can be internal or external, can be connected to the system bus 1521 via the user input interface of input 1540, or other appropriate mechanism. In a networked environment, program modules depicted relative to the computer 1510, or portions thereof, can be stored in a remote memory storage device. It will be appreciated that the network connections shown and described are exemplary and other means of establishing a communications link between the computers can be used.

Example Networking Environment

Figure 16:
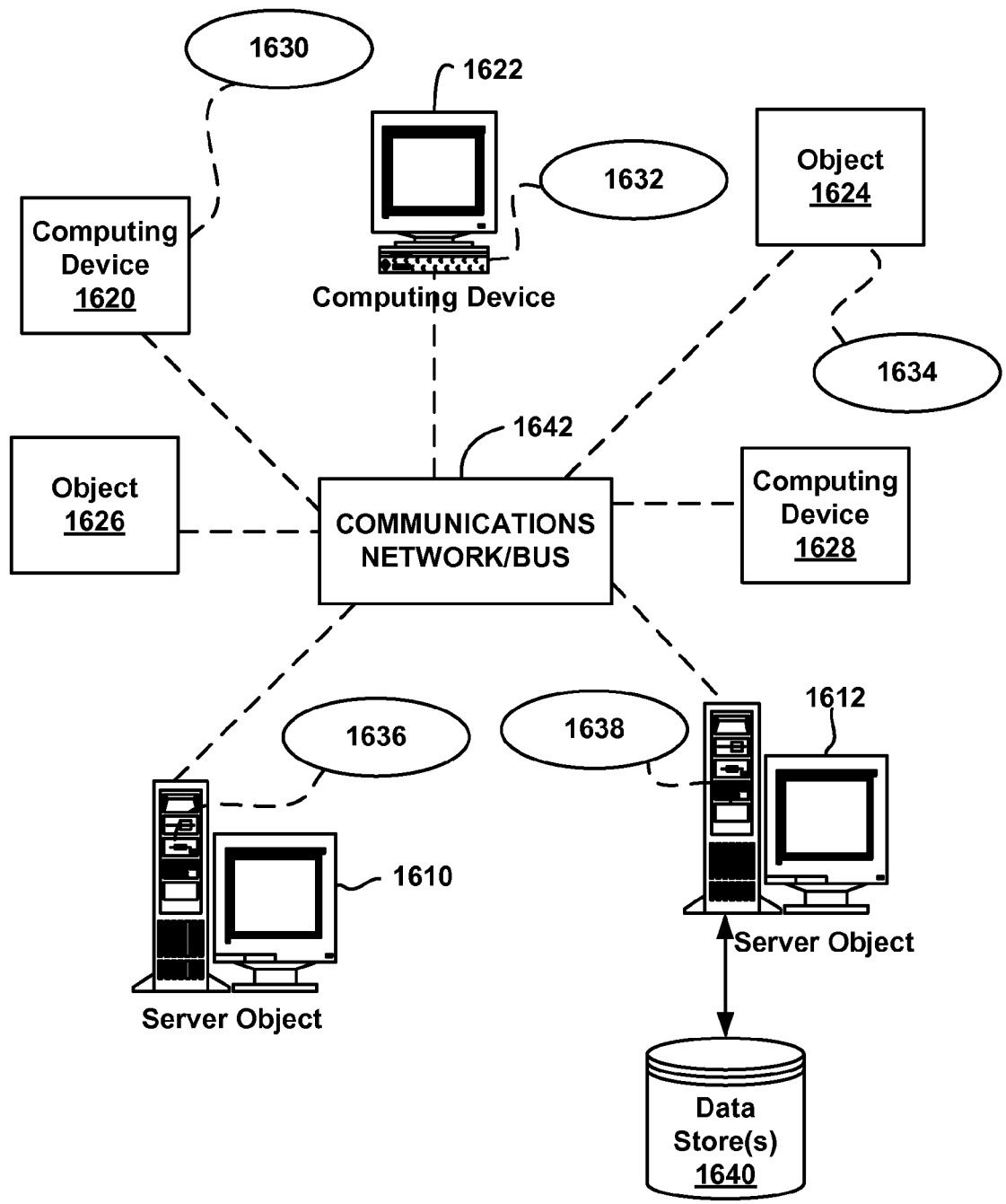
FIG. 16 illustrates a block diagram of an example data communication network that can be operable in conjunction with various aspects described herein.

FIG. 16 provides a schematic diagram of an exemplary networked or distributed computing environment. The distributed computing environment comprises computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638 and data store(s) 1640. It can be appreciated that computing objects 1610, 1612, etc. and computing objects or devices 1620, 1622, 1624, 1626, 1628, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1640 can include registers, or other similar data stores disclosed herein.

Each computing object 1610, 1612, etc. and computing objects or devices 1620, 1622, 1624, 1626, 1628, etc. can communicate with one or more other computing objects 1610, 1612, etc. and computing objects or devices 1620, 1622, 1624, 1626, 1628, etc. by way of the communications network 1642, either directly or indirectly. Even though illustrated as a single element in FIG. 16, communications network 1642 may comprise other computing objects and computing devices that provide services to the system of FIG. 16, and/or may represent multiple interconnected networks, which are not shown. Each computing object 1610, 1612, etc. or computing object or devices 1620, 1622, 1624, 1626, 1628, etc. can also contain an application, such as applications 1630, 1632, 1634, 1636, 1638, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 16, as a non-limiting example, computing objects or devices 1620, 1622, 1624, 1626, 1628, etc. can be thought of as clients and computing objects 1610, 1612, etc. can be thought of as servers where computing objects 1610, 1612, etc., acting as servers provide data services, such as receiving data from client computing objects or devices 1620, 1622, 1624, 1626, 1628, etc., storing of data, processing of data, transmitting data to client computing objects or devices 1620, 1622, 1624, 1626, 1628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1642 or bus is the Internet, for example, the computing objects 1610, 1612, etc. can be Web servers with which other computing objects or devices 1620, 1622, 1624, 1626, 1628, etc. communicate via any of a number of known protocols, such as the hypertext transfer protocol (HTTP). Computing objects 1610, 1612, etc. acting as servers may also serve as clients, e.g., computing objects or devices 1620, 1622, 1624, 1626, 1628, etc., as may be characteristic of a distributed computing environment.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
   a memory storing computer executable components; and
   a processor configured to execute the following computer executable components stored in the memory:
   an aggregation component configured for reformatting a first set of signals associated with a first data rate and a second set of signals associated with a second data rate that is higher than the first data rate, and for combining the first set of signals and the second set of signals to generate a combined signal that comprises a higher data rate than the first data rate and the second data rate; and a transmitter component configured for receiving the combined signal and generating one or more data streams based on the combined signal.

2. The system of claim 1, wherein the aggregation component is further configured for receiving the first set of signals and the second set of signals via a set of physical connections.

3. The system of claim 1, wherein the first data rate is 10 gigabits per second and the second data rate is 40 gigabits per second.

4. The system of claim 1, wherein a signal from the first set of signals comprises a serial stream of formatted blocks.

5. The system of claim 1, wherein the aggregation component is configured for generating an alignment marker signal to identify a virtual lane of the combined signal that is not associated with the first set of signals and the second set of signals.

6. The system of claim 1, wherein the aggregation component comprises a mapper component configured for encapsulating at least the first set of signals into a set of container signals that comprise a signal format different than the first set of signals.

7. The system of claim 6, wherein the aggregation component comprises a frame generator component configured for generating a set of modified signals as a function of the set of container signals.

8. The system of claim 7, wherein the aggregation component comprises an alignment marker component configured for inserting an alignment marker value into an alignment marker field for each signal from the set of modified signals.

9. The system of claim 7, wherein the aggregation component comprises a de-multiplexer component configured for de-multiplexing each signal from the set of modified signals to generate a plurality of virtual lanes of the combined signal.

10. The system of claim 9, wherein the plurality of virtual lanes are multi-link gearbox lanes.

11. The system of claim 1, further comprising a crossbar component configured for mapping a plurality of virtual lanes of the combined signal.

12. The system of claim 1, further comprising a de-skew component configured for aligning one or more tributary signals of at least one signal from the second set of signals.

13. The system of claim 12, further comprising a receiver component configured for de-interleaving the one or more data streams to generate a pseudo signal at a data rate of the combined signal.

14. The system of claim 13, further comprising a de-aggregation component configured for recovering the first set of signals and the second set of signals from the pseudo signal.

15. A method, comprising:
receiving, by a system comprising a processor, a first set of signals associated with a first data rate and a second set of signals associated with a second data rate that is higher than the first data rate;
reformatting, by the system, a signal format of the first set of signals and the second set of signals to generate a plurality of modified signals; and
combining, by the system, the plurality of modified signals to generate a combined signal that comprises a higher data rate than the first data rate and the second data rate.

16. The method of claim 15, further comprising:
encoding, by the system, a plurality of virtual lanes of the combined signal to generate one or more data streams; and
transmitting, by the system, the one or more data streams.

17. The method of claim 16, further comprising:
decoding, by the system, the one or more data streams to generate a pseudo signal at a data rate of the combined signal.

18. The method of claim 17, further comprising:
reconstructing, by the system, the plurality of modified signals from the pseudo signal.

19. The method of claim 18, further comprising:
recovering, by the system, the first set of signals and the second set of signals from the plurality of modified signals.

20. The method of claim 15, further comprising:
receiving, by the system,
the first set of signals and the second set of signals from a network processing unit.

21. The method of claim 15, further comprising:
encoding, by the system, a plurality of virtual lanes associated with the first set of signals and the second set of signals to generate one or more data streams;
transmitting, by the system, the one or more data streams;
decoding, by the system, the one or more data streams to generate a pseudo signal at a data rate of the combined signal; and
recovering, by the system, the first set of signals and the second set of signals from the pseudo signal.

22. A system, comprising:
means for receiving a first set of signals associated with a first data rate and a second set of signals associated with a second data rate that is higher than the first data rate;
means for reformatting a signal format of the first set of signals and the second set of signals; and
means for combining the first set of signals and the second set of signals to generate a combined signal that comprises a higher data rate than the first data rate and the second data rate.

* * * * *